US012601321B2

(12) United States Patent
Harris

(10) Patent No.: US 12,601,321 B2
(45) Date of Patent: Apr. 14, 2026

(54) APPARATUS TO CONVERT HYDROKINETIC ENERGY INTO ELECTRICAL ENERGY

(71) Applicant: Martin Harris, Menifee, CA (US)

(72) Inventor: Martin Harris, Menifee, CA (US)

( * ) Notice: Subject to any disclaimer, the term of this patent is extended or adjusted under 35 U.S.C. 154(b) by 0 days.

(21) Appl. No.: 19/409,551

(22) Filed: Dec. 4, 2025

(65) Prior Publication Data

US 2026/0092589 A1 Apr. 2, 2026

Related U.S. Application Data

(63) Continuation of application No. PCT/US2025/025462, filed on Apr. 18, 2025.

(60) Provisional application No. 63/705,325, filed on Oct. 9, 2024, provisional application No. 63/642,955, filed on May 6, 2024.

(51) Int. Cl.
*F03B 17/06* (2006.01)

(52) U.S. Cl.
CPC ...... *F03B 17/067* (2013.01); *F05B 2220/706* (2013.01)

(58) Field of Classification Search
CPC ........................ F03B 17/067; F05B 2220/706
See application file for complete search history.

(56) References Cited

U.S. PATENT DOCUMENTS

| | | | | |
|---|---|---|---|---|
| 4,272,686 | A | 6/1981 | Suzuki | |
| 7,222,487 | B1 | 5/2007 | Hinkley | |
| 8,624,417 | B2 | 1/2014 | Song | |
| 8,763,386 | B2 | 7/2014 | Greene | |
| 2011/0080002 | A1* | 4/2011 | Santana | F03B 17/005 415/916 |
| 2012/0031093 | A1 | 2/2012 | Greene | |
| 2019/0048846 | A1 | 2/2019 | Hochstein et al. | |

FOREIGN PATENT DOCUMENTS

| | | | |
|---|---|---|---|
| CN | 117856530 | A | 4/2024 |
| WO | 2015116156 | A1 | 8/2015 |

* cited by examiner

*Primary Examiner* — Viet P Nguyen
(74) *Attorney, Agent, or Firm* — INNOVATION CAPITAL LAW GROUP, LLP; Vic Lin

(57) ABSTRACT

A hydrokinetic apparatus for generating electricity is similar to a large wheel having a central axis; one or more support rings; and multiple spokes where the proximal end is attached to the central axis. Some spokes, named conduits, are hollow spokes having a turbine located proximately to the central axis and at least one valve that may open and close as appropriate to allow the ingress and egress of water into the hollow spoke. Counterweight spokes are configured to assist in rotating the wheel. Support spokes give the apparatus structural support. As the wheel rotates, a conduit containing water will rotate into the upper half of the wheel and open its valve to release the water into an opposing conduit in the lower half of the wheel that has opened its valve to receive the water. The water will pass through at least one turbine, thereby generating electricity.

13 Claims, 21 Drawing Sheets

APPARATUS TO CONVERT HYDROKINETIC ENERGY INTO ELECTRICAL ENERGY

BACKGROUND OF THE INVENTION

1. Field of the Invention

The present invention relates to the field of generating electrical energy by means of a hydrokinetic apparatus. More particularly, the present invention relates to a hydrokinetic apparatus resembling a partially submerged wheel. As the wheel turns, water ingresses or egresses from the spokes, namely conduits, attached to the central axis at one end and to the wheel's rim at the opposing end. As the water ingresses or egresses from the conduits, the water will pass through a turbine and generate electricity.

2. Description of the Related Art

Hydrokinetics relates to the field where the motion of fluids creates forces that are, in turn, used for other purposes. A standard hydrokinetic apparatus is a watermill. A watermill is a structure that uses a water wheel or water turbine to drive a mechanical process such as milling (grinding), rolling, or hammering. Such processes are needed to produce many material goods, including flour, lumber, paper, textiles, and metal products. Hydrokinetic apparatuses have been used in a variety of industrial fields for a variety of purposes. One industrial field of primary interest is using hydrokinetic technology for the purpose of generating electricity.

There are many advantages of an apparatus that converts hydrokinetic energy into electrical energy. One advantage of hydrokinetic apparatuses is that electricity can be generated with little or no reliance on fossil fuels. As hydrokinetic apparatuses are clean energy apparatuses, they lower the carbon footprint, which is good for the environment. Hydrokinetic apparatuses may be situated in various locations and do not require the extensive infrastructure needed by apparatuses using fossil fuels to generate electricity. Hydrokinetic apparatuses may be used to generate electricity where it is difficult to tap into an existing electrical grid, such as on islands or oil rigs. Where electrical grids are present, hydrokinetic apparatuses may be used to augment existing electrical plants to reduce brownouts or handle high-demand seasons. Hydrokinetic apparatuses are not reliant on more finicky clean energy sources such as wind or sun but on water. The water may be self-contained when the hydrokinetic apparatus is on land, or the water may be drawn from a body of water when a hydrokinetic apparatus is submerged, fully or partially, into the body of water.

U.S. Pat. No. 8,763,386 to Geoffrey Greene titled "Large water turbine" discloses a hydrokinetic apparatus resembling a wheel having a central axis, a rim, and multiple blades extending from the central axis to the rim. The Greene apparatus is fully submerged and moored to a river or ocean floor. The natural water movement through the blades causes the Greene apparatus to rotate. Tanks found in the rim of the Greene apparatus are symmetrical and opposite to one another, creating a working pair where one tank is empty and the other is full of water. As the Greene apparatus rotates, water in the upper paired tank will fall into its lower paired tank. As the water moves between the tanks, it will pass through a turbine and generate electricity. The Greene apparatus has several disadvantages. First, being fully submerged in water and attached to the floor of the river or ocean where it is located, it is difficult to install, configure, and maintain. Electrical transmission lines from the Greene apparatus to a power plant above the surface of the water are also difficult to install, configure, and maintain. The Greene apparatus is, therefore, challenging to implement.

United States patent publication 20190048846 to John I. Hochstein et al. titled "Hydrokinetic Turbine Having Helical Tanks" discloses a hydrokinetic apparatus resembling a wheel having a central axis where a turbine is found, a continuous tubular body arranged in a helix-like shape, and multiple blades extending from the central axis to the rim of the tubular body. Just as with the Greene apparatus, the Hochstein apparatus is also configured to be submerged in a flowing body of water. Preferably, the Hochstein apparatus is anchored to an ocean floor or a deep riverbed through the use of at least two mooring lines. The natural flow of water through the blades on the Hochstein apparatus causes it to rotate. As the Hochstein apparatus rotates, water moves through the continuous tubular body arranged in a helix-like shape and eventually passes through the turbine at the central axis. The Hochstein apparatus, being fully submerged, suffers from the same disadvantages that are found with the Greene apparatus. Additionally, having only one turbine, the Hochstein apparatus suffers from poor electrical generation at many angular positions.

It is apparent that there are advantages to using hydrokinetic apparatuses that rotate as a wheel to capture the movement of water and convert it into electricity. However, hydrokinetic apparatuses found in the prior art are restricted to installations where they may be fully submerged. Installing, configuring, and maintaining such apparatuses is challenging because much of the work must be done beneath the surface of the water. If a turbine were to fail, the repair must be done within an environment that is difficult for humans to function within. Therefore, a need exists for a hydrokinetic apparatus that may rotate as a wheel to capture the movement of water and convert the same into electricity that is easy to install, configure, and maintain. It is also advantageous that such a hydrokinetic apparatus may be installed on land or partially submerged in water.

BRIEF SUMMARY OF THE INVENTION

The present disclosure is for multiple embodiments of apparatuses that convert hydrokinetic energy into electrical energy. Each embodiment will be referred to as the "hydrokinetic apparatus" hereafter. The hydrokinetic apparatus resembles a wheel and is configured to operate on land or, preferably, be partially submerged in a body of water. The wheel has a central axis and one or more concentric support rings about the central axis that provide structural support to one or more spokes that radially connect to and extend from the central axis. In some embodiments, the outermost support ring is a conduit where water is allowed to flow within and pass through one or more turbines set within the conduit. In other embodiments, the spokes are conduits where water is allowed to flow within and pass through one or more turbines set within the conduit forming the spoke. Although the word "water" is used to identify the fluid that flows within a conduit and passes through a turbine found within the conduit, any one of several different kinds of fluids may be used. For simplification, the word "water" will identify the fluid flowing through a conduit. Preferably, the water will contain bacterial and corrosion inhibitors.

The hydrokinetic apparatus may generate electrical energy by either configuring the outermost support ring as a conduit containing one or more turbines or by configuring one or more spokes as a conduit containing a turbine. When the outermost support ring is configured as a conduit, and the wheel is rotated, water within the conduit will flow to the lowest point on the outermost support ring. As the wheel rotates further, a new lowest point is established, and water will flow to that new point. Eventually, the water will pass through a turbine, generating electricity. Bidirectional valves, simply identified as "valves" in the plural or "valve" in the singular, placed within the conduit, may lift the water as the wheel rotates to increase the kinetic energy stored in the water. Once the water has been lifted to the appropriate height, the valve is opened to allow the water to travel to the lowest point on the outermost support ring with a greater velocity, resulting in a greater amount of electrical energy being generated. When a spoke is configured as a conduit, and the wheel rotates, water within the conduit will flow to the lowest point within the conduit. Sometimes, the lowest point will be at the outermost support ring, and when rotated 180 degrees, the lowest point will be at the central axis. As the water flows to the lowest point, it passes through a turbine that generates electrical energy. Valves placed within the conduit may lift the water as the wheel rotates to increase the kinetic energy stored in the water. Once the water has been lifted to the appropriate height, the valve is opened to allow the water to travel to the lowest point on the spoke with a greater velocity, increasing the amount of electrical energy generated.

The hydrokinetic apparatus may be configured with a counterweight that is attached to its central axis. The counterweight may rotate conjointly with the central axis to assist in rotating the wheel. The counterweights may work with valves found within the conduits to minimize the energy needed to maximize the kinetic energy of the water within the conduits. Counterweights may operate within the outermost support ring or beyond the outermost support ring. Counterweights are generally solid but may be empty and filled with other materials to provide ballast, such as water, another form of liquid, sand, rock, or other materials suitable for ballast.

The hydrokinetic apparatus may require external energy to start its rotation operation. The wheel's outermost support ring may be configured with an arrangement of teeth. These teeth are designed to mate with matching teeth found on a drive gear that is operably engaged with the wheel and to cause the wheel to rotate. The wheel's outermost support ring may be configured with a surface with a high friction coefficient. The surface of the outermost support ring is operably engaged with a drive wheel that causes the wheel to rotate. The drive gear or the drive wheel may be constantly engaged with the outermost support ring, or once the wheel has been set in motion, the drive gear or the drive wheel may be withdrawn from the wheel.

The diameter of the conduits may be scaled to any suitable size to generate the desired electrical output. The valves within the conduits allow for the bidirectional flow of water within the conduit or for water to ingress and egress the conduit.

BRIEF DESCRIPTION OF DRAWINGS

The present invention will become more fully understood from the detailed description and accompanying drawings. Other systems, methods, features, and advantages of the invention will be or will become apparent to one with skill in the art upon examination of the following figures and detailed description. It is intended that all such additional systems, methods, features, and advantages be included within this description, be within the scope of the invention, and be protected by the accompanying claims. Component parts shown in the drawings are not necessarily to scale and may be exaggerated to better illustrate the important features of the invention. Dimensions disclosed or shown are exemplary only. In the drawings, like reference numerals may designate like parts throughout the different views, wherein:

DETAILED DESCRIPTION OF THE INVENTION

Figure 1:
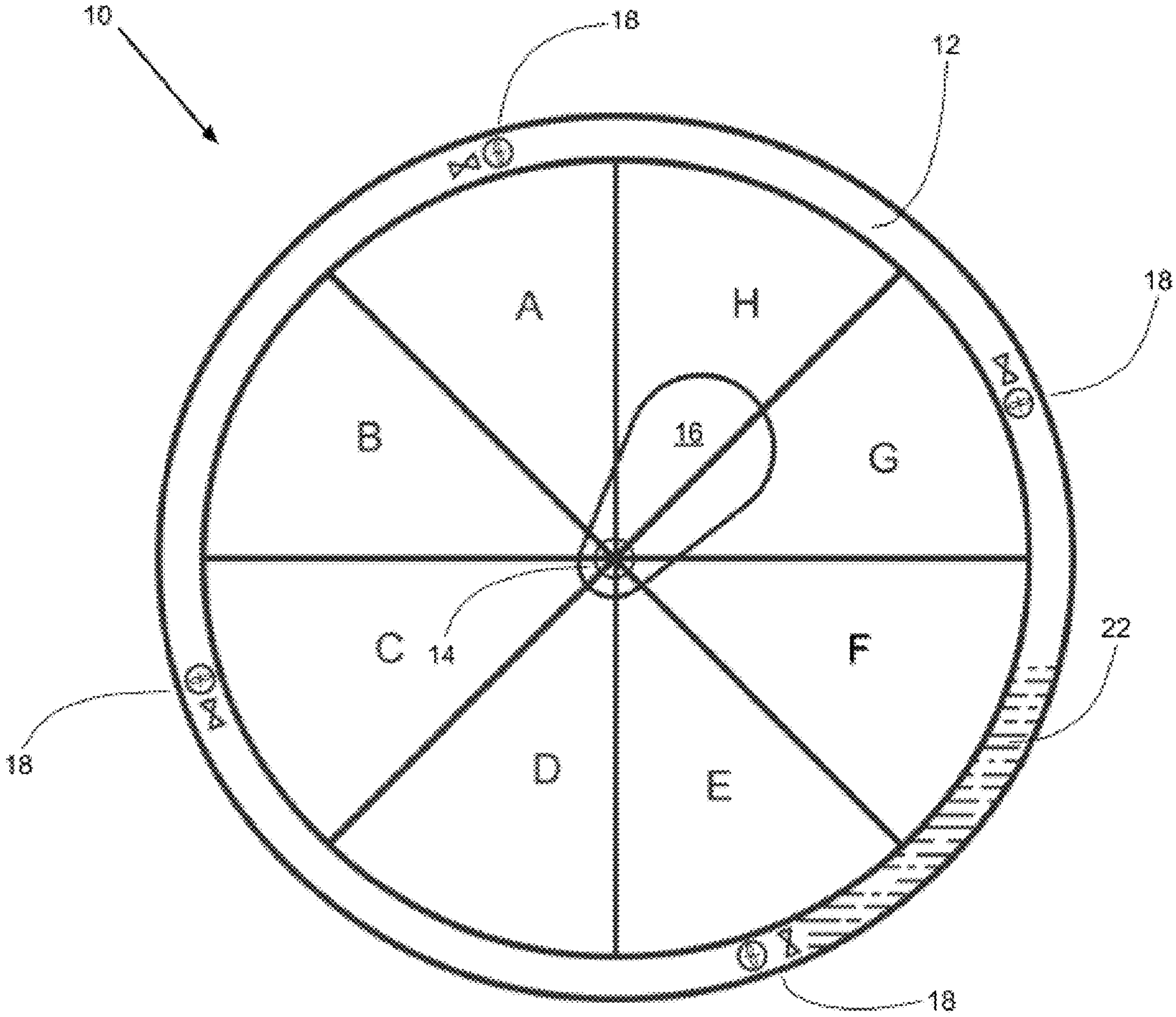
FIG. 1 shows the first embodiment of an apparatus that generates electricity using hydrokinetic energy.

In the following description, for purposes of explanation, specific numbers, materials, and configurations are set forth in order to provide a thorough understanding of the invention. It will be apparent, however, to one having ordinary skill in the art that the invention may be practiced without these specific details. In some instances, well-known features may be omitted or simplified so as not to obscure the present invention. Furthermore, reference in the specification to "one embodiment" or "an embodiment" means that a particular feature, structure, or characteristic described in connection with the embodiment is included in at least one embodiment of the invention. The appearances of the phrase "in an embodiment" in various places in the specification do not necessarily all refer to the same embodiment. In the descriptions of the various embodiments disclosed herein, the focus has been on disclosing the apparatuses and how they function. One with ordinary skill in the art will know how to design and implement the necessary mechanical elements to structurally support the apparatuses disclosed herein. Finally, the many views of the apparatuses being disclosed are shown as a cross section views to show the internal components of the apparatus.

Utilizing natural, clean, renewable energy has emerged as critical to combating global warming. The major sources of natural clean energy are the sun, the ground, wind, and water. The use of natural energy to harness power from different sources is limited for various reasons. The use of the sun and wind energy is limited mainly by the inconsistent availability of the energy source, depending on weather, seasonal changes, and day and night cycles. The use of ground energy is limited by geographical location and difficulties in drilling a few miles below the ground's surface. Water is the most abundant source of clean energy, but the use of energy derived from water is limited by conventional technology that requires dam construction, high water flow, usually exceeding a few meters per second, and the complexity of corresponding energy-harnessing devices. However, water has many advantages over ground and wind energy sources, primarily when used as a kinetic energy source.

Kinetic energy sources of water movement can be mainly divided into three categories: (1) horizontal movement resulting from height differences between two locations in a river, (2) vertical movement of water in a human-built dam or waterfall, and (3) oscillatory movement originated from a combination of the horizontal and vertical movement of water, found mainly in the ocean.

An apparatus designed to generate electrical energy from a hydrokinetic energy source is disclosed herein. Traditionally, a hydrokinetic energy source is thought of as a river (horizontal kinetic energy source), a waterfall or dam (vertical kinetic energy source), or an ocean (oscillatory kinetic energy source). However, the hydrokinetic energy source disclosed herein is an apparatus that contains water, and the apparatus may either rotate or swing to create hydrokinetic energy that can be converted into electrical energy.

FIG. 1 shows first embodiment 10 of such an apparatus. In FIG. 1, first embodiment 10 is in the form of a wheel having central axis 14 and circular conduit 12. Connecting central axis 14 and circular conduit 12 are a plurality of spokes. In FIG. 1, first embodiment 10 is shown with eight spokes, but there may be fewer or more spokes than eight, depending on the circumstances. Within circular conduit 12 are found two or more power station 18 with FIG. 1 showing four power station 18. A segment of circular conduit 12 between two power station 18 is used to hold a certain amount of water 22 or some other liquid that may freely move within circular conduit 12. Each power station 18 has a valve that is used to control the movement of water 22 and a turbine. The letters A through H are used to denote a certain arc, in FIG. 1, the arc being 45 degrees, of first embodiment 10. Finally, on central axis 14 is found counterweight 16. Counterweight 16 may be used to assist in turning first embodiment 10. Not shown in FIG. 1 are motors or other mechanisms that may assist counterweight 16 in rotating first embodiment 10. Additionally, first embodiment 10 works equally well when rotating counterclockwise as when rotating clockwise or when oscillating between the two rotational directions.

Figure 2:
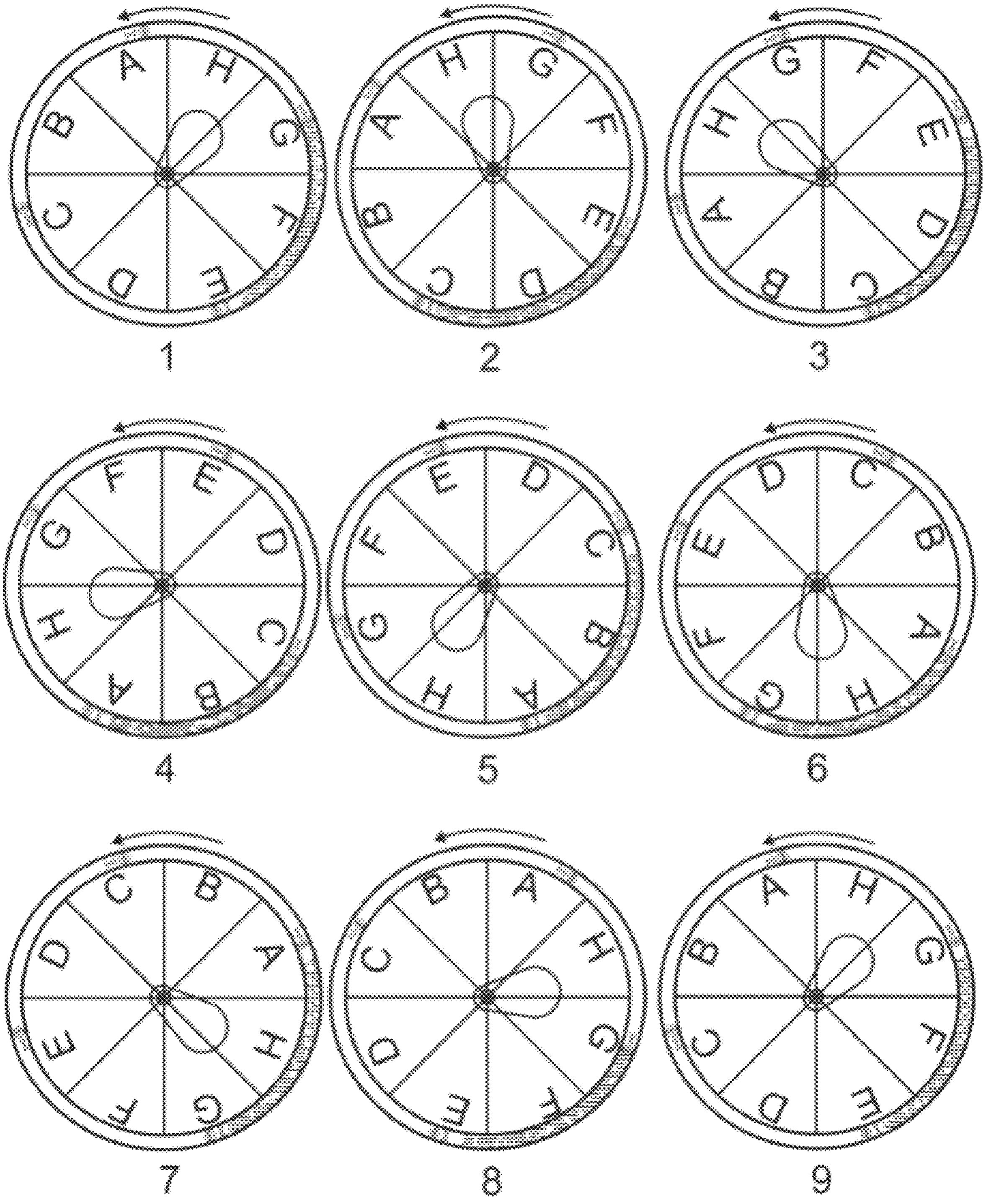
FIG. 2 shows the iterations taken by the apparatus of FIG. 1 to generate electricity.

The following is a description of the operation of first embodiment 10. In FIG. 2, one may see first embodiment 10 divided into eight equal 45-degree sectors labeled A through H. Additionally, in FIG. 2, first embodiment 10 rotates counterclockwise in the direction of the arrow positioned above first embodiment 10. Finally, in FIG. 1, below each first embodiment 10 is shown an iteration number showing the progress of a single complete rotation of first embodiment 10.

As first embodiment 10 rotates, the column of water in sectors G, F, and E rises to create a significant amount of pressure on the valve for the turbine in sector E. This is the state shown in iteration 1. At this point, the valve for power station 18 at sector E is opened, and the water is allowed to flow past power station 18 in sector E as first embodiment 10 turns counterclockwise to generate electricity. Simultaneously, with the opening of the valve for power station 18 at sector E, the valve for power station 18 at sector C is closed. As first embodiment 10 continues to rotate, the water will flow into sectors E, D, and C as the valve for power station 18 at sector C is closed to prevent the water in sectors E, D, and C from flowing into sector B. This is the state shown in iteration 2. As first embodiment 10 continues to rotate, the column of water in sectors E, D, and C rises to create a significant amount of pressure on the valve for power station 18 in sector C. This is the state shown in iteration 3. At this point, the valve for power station 18 at sector C is opened, and the water is allowed to flow past power station 18 in sector C as first embodiment 10 turns counterclockwise to generate electricity. Simultaneously, with the opening of the valve for power station 18 in sector C, the valve for power station 18 in sector A is closed. As first embodiment 10 continues to rotate, the water will flow into sectors C, B, and A as the valve for power station 18 at sector A is closed to prevent the water in sectors C, B, and A from flowing into sector H. This is the state shown in iteration 4. As first embodiment 10 continues to rotate, the column of water in sectors C, B, and A rises to create a significant amount of pressure on the valve for power station 18 in sector A. This is the state shown in iteration 5. At this point, the valve for power station 18 at sector A is opened, and the water is allowed to flow past power station 18 in sector A as first embodiment 10 turns counterclockwise to generate electricity. Simultaneously, with the opening of the valve for power station 18 in sector A, the valve for power station 18 in sector G is closed. As first embodiment 10 continues to rotate, the water will flow into sectors A, H, and G as the valve for power station 18 at sector G is closed to prevent the water in sectors A, H, and G from flowing into sector F. This is the state shown in iteration 6. As first embodiment 10 continues to rotate, the column of water in sectors A, H, and G rises to create a significant amount of pressure on the valve for power station 18 in sector G. This is the state shown in iteration 7. At this point, the valve for power station 18 at sector G is opened, and the water is allowed to flow past power station 18 in sector G as first embodiment 10 turns counterclockwise to generate electricity. Simultaneously with the opening of the valve for power station 18 at sector G, the valve for power station 18 at sector E is closed. As first embodiment 10 continues to rotate, the water will flow into sectors G, F, and E as the valve for power station 18 at sector E is closed to prevent the water in sectors G, F, and E from flowing into sector D. This is the state shown in iteration 8. As first embodiment 10 continues to rotate, the column of water in sectors G, F, and E rises to create a significant amount of pressure on the valve for power station 18 in sector E. This is the state shown in iteration 9, which is the same as iteration 1, and first embodiment 10 has completed one revolution. Note that if first embodiment 10 is rotated clockwise, the process will be the same.

One with skill in the art will recognize that first embodiment 10 may be rotated by a number of different means. A preferred means of rotating first embodiment 10 is by using drive wheel 24 shown in FIG. 3 at the base of first embodiment 10. Drive wheel 24 is similar to a tire on a car. Drive wheel 24 is connected to a drive shaft that, in turn, is connected to a motor. The drive shaft and motor are not shown in FIG. 3. The motor turns the drive shaft, and the drive shaft turns drive wheel 24. The tire portion of drive wheel 24 is in friction contact with circular conduit 12. As drive wheel 24 turns, so will first embodiment 10 turn. Mechanisms that are known in the art may disengage drive wheel 24 from circular conduit 12 when first embodiment 10 turns on its own with assistance from counterweight 16. Additionally, drive wheel 24 may also act as a break for first embodiment 10 by resisting its rotational movement. The drive shaft of drive wheel 24 may also be connected to generator 28. When first embodiment 10 is turning with the assistance of counterweight 16, at certain rotational positions of counterweight 16, first embodiment 10 will rotate with greater velocity. At this point, drive wheel 24 may engage with circular conduit 12, thereby causing drive wheel 24 drive shaft to rotate. This mechanical rotation of the drive shaft may be captured by generator 28 and converted into electrical energy.

Figure 3:
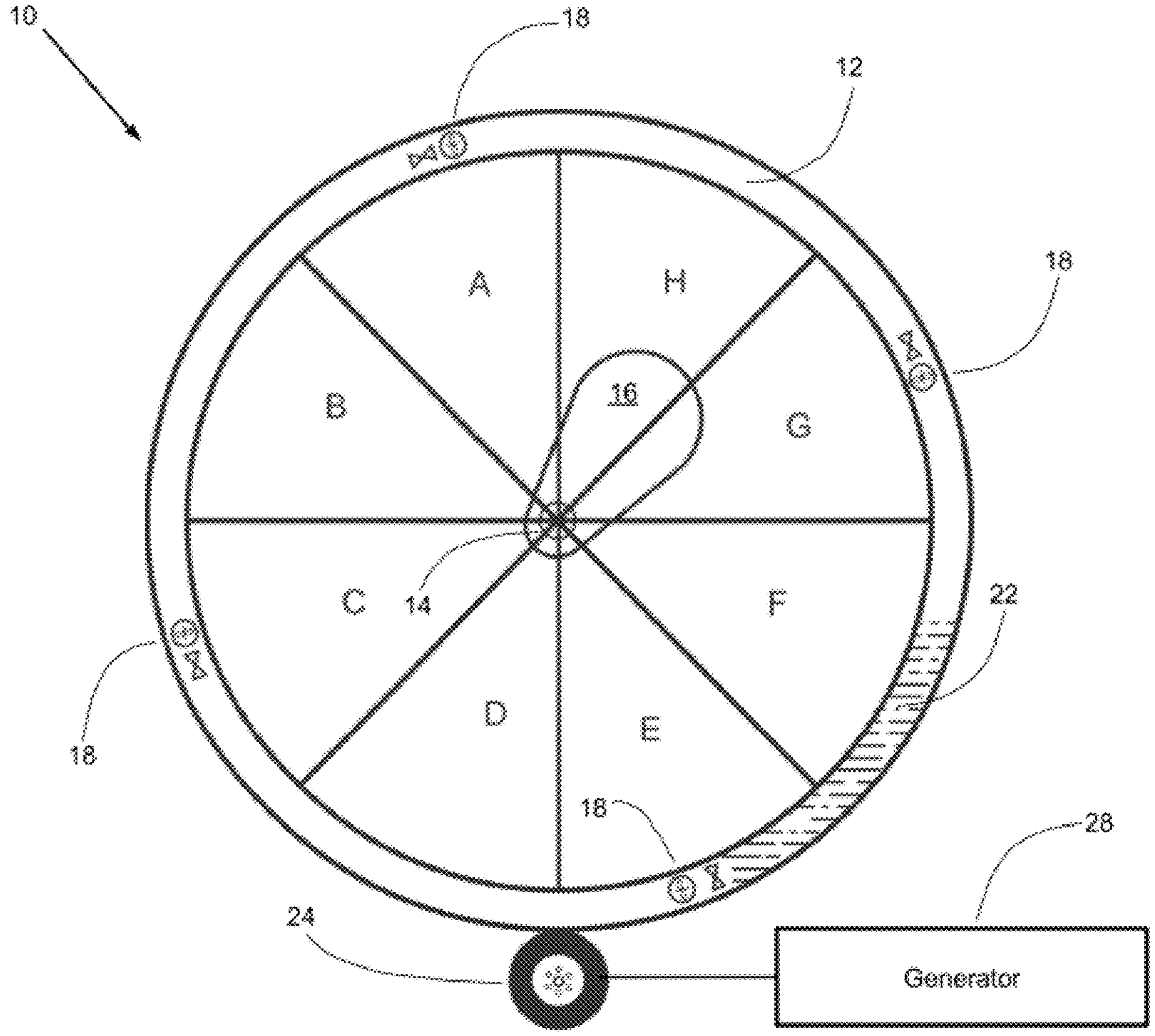
FIG. 3 shows the apparatus of FIG. 1, along with a wheel at its base that rotates it.
Figure 4:
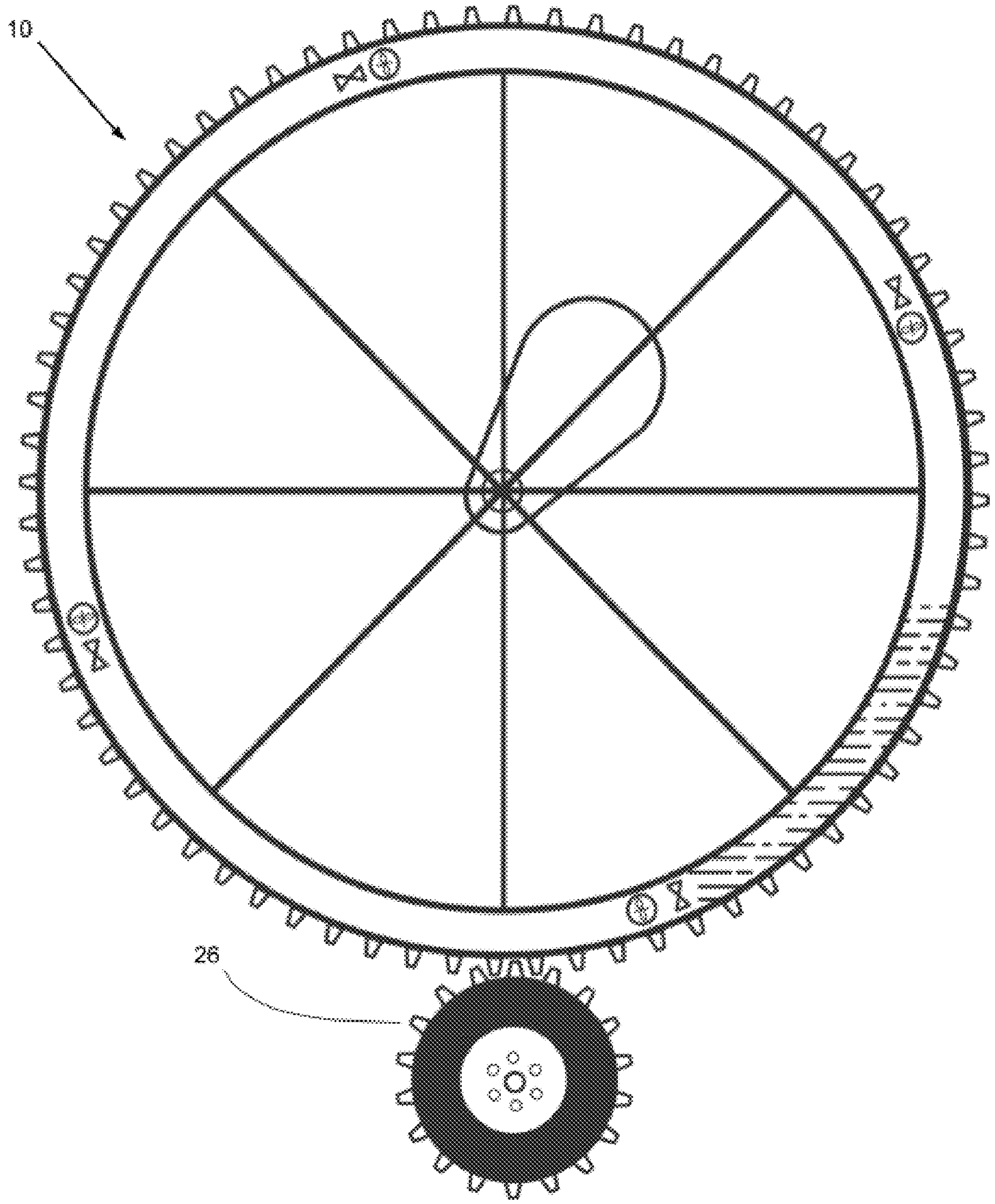
FIG. 4 shows the apparatus of FIG. 1, along with a gear at its base that rotates it.

An alternate means of rotating first embodiment 10 is by using drive gear 26 as shown in FIG. 4. Drive gear 26 operates similarly as drive wheel 24 being connected to a drive shaft that is turned by a motor. However, rather than the tire on drive wheel 24 that frictionally engages with circular conduit 12, teeth on drive gear 26 engage with matching teeth on circular conduit 12 to turn first embodiment 10. FIG. 3 and FIG. 4 show drive wheel 24 and drive gear 26 at the bottom of first embodiment 10. However, drive wheel 24 or drive gear 26 may engage circular conduit 12 at any one of a number of positions about either the outer or inner surface of circular conduit 12. Additionally, one with skill in the art will recognize that drive wheel 24 or drive gear 26 may operate on first embodiment 10 using the surface of another mechanism, similar to circular conduit 12, that extends beyond or within the radius of circular conduit 12. Finally, drive wheel 24 or drive gear 26 may have their own counterweights that work in conjunction with counterweight 16 to assist in rotating first embodiment 10. Other alternative means of rotating first embodiment 10 exist that are well-known in the art and applicable, but will not be discussed here.

Figure 5:
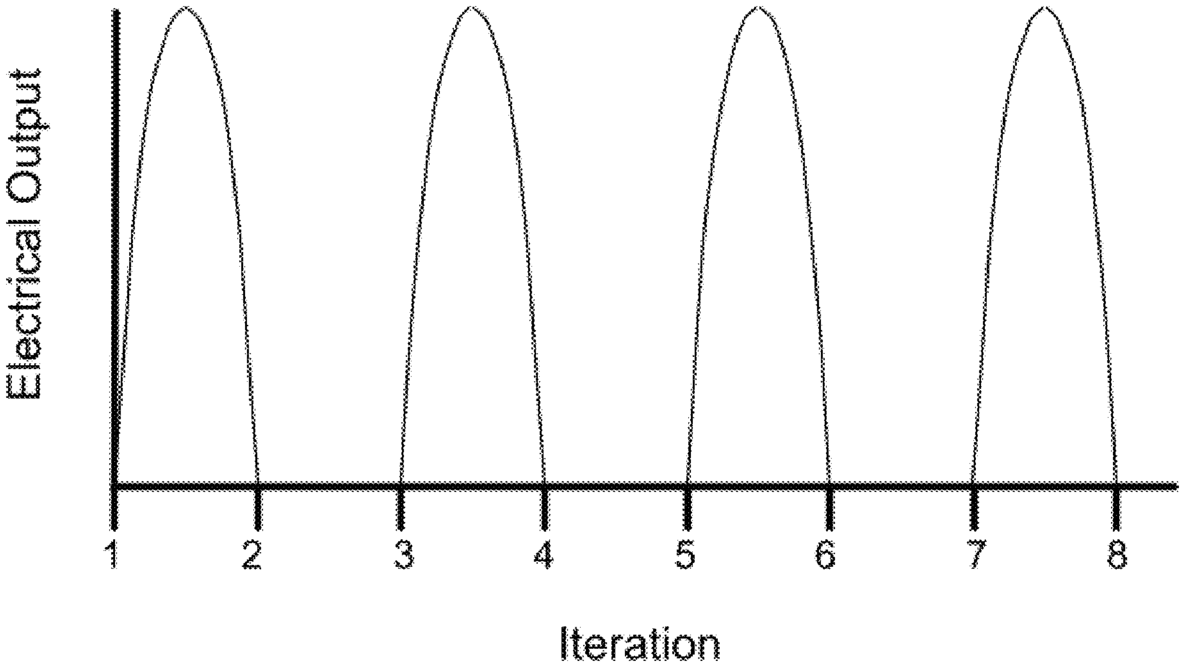
FIG. 5 shows a graph depicting the electrical charge generated by the apparatus of FIG. 1 at each iteration.

Additionally, first embodiment 10 may include counterweight 16 that is roughly in the shape of a teardrop. Counterweight 16 is attached to central axis 14 with its heavier and wider portion extending away from central axis 14. Counterweight 16 may take many different forms, from that of a teardrop, and may operate within or beyond the region enclosed by circular conduit 12. Counterweight 16 is generally solid but may be empty and filled with other materials to provide ballast, such as water, another form of liquid, sand, rock, or other materials suitable for ballast. In FIG. 2, counterweight 16 assists in the movement of first embodiment 10 during iterations 2, 3, 4, and 5. However, first embodiment 10 must work harder during iterations 6, 7, 8, and 9. Note that iterations 1 and 9 are the same and thus interchangeable. FIG. 5 shows the electricity generation versus time in units of the iterations shown in FIG. 2. Here, we see that electrical power generation occurs between iterations 1 and 2, 3 and 4, 5 and 6, and 7 and 8. Note that iteration 9 is not shown in FIG. 5, as it is the same as iteration 1.

One with skill in the art will recognize that first embodiment 10 may be configured with a number of power station 18 other than four, as has been shown in the figures, and that first embodiment 10 may be scaled so that its diameter may vary as well as the diameter of circular conduit 12. One with skill in the art will also recognize that multiple first embodiment 10 may be connected in series to increase the voltage of the electricity being generated or connected in parallel to increase the current of the electricity being generated. Moreover, the multiple first embodiment 10 may be "phased" differently so that the dead spots shown in FIG. 5 between iterations 2 and 3, 4 and 5, 6 and 7, and 8 and 1 may be filled in by energy generated by other first embodiment 10 having a different degree of phasing.

Figure 6:
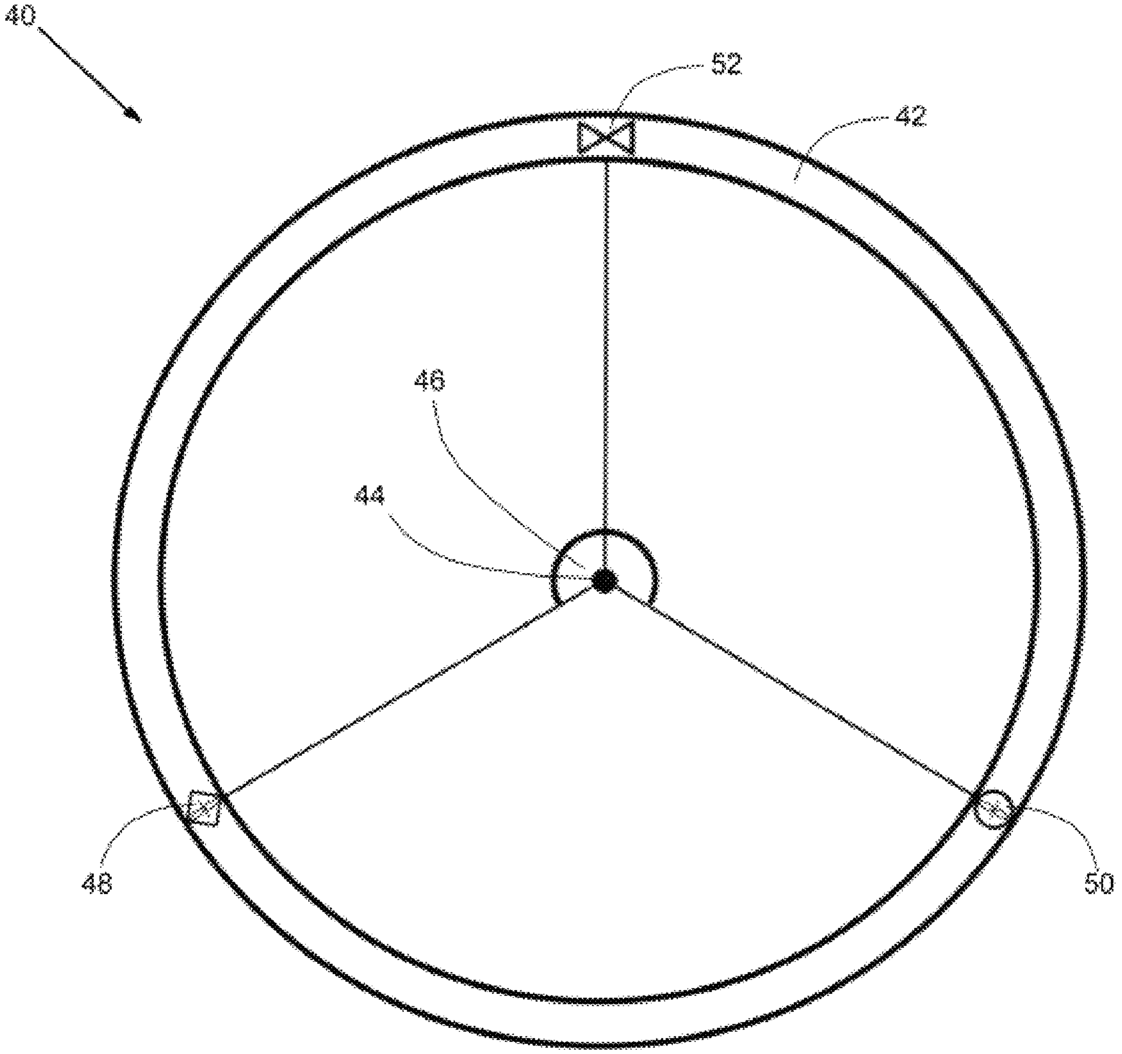
FIG. 6 shows a second embodiment of an apparatus that generates electricity using hydrokinetic energy.

FIG. 6 shows a secondary embodiment of the apparatus to create hydrokinetic energy identified as second embodiment 40. Second embodiment 40 is similar to first embodiment 10 in that it also appears as a wheel having circular conduit 42 that allows water to pass through and rotates about central axis 44. Proximate to central axis 44 may be found counterweight 46, and within circular conduit 42 is found first power station 48 expressed as a turbine within a diamond, second power station 50 expressed as a turbine within a circle, and valve 52. Each power station comprises both a turbine and a valve. Although FIG. 6 shows second embodiment 40 with only two power stations, second embodiment 40 may have one or more power stations with valves that allow for the control of the flow of water. Finally, second embodiment 40 has one bidirectional valve-valve 52.

Figure 7:
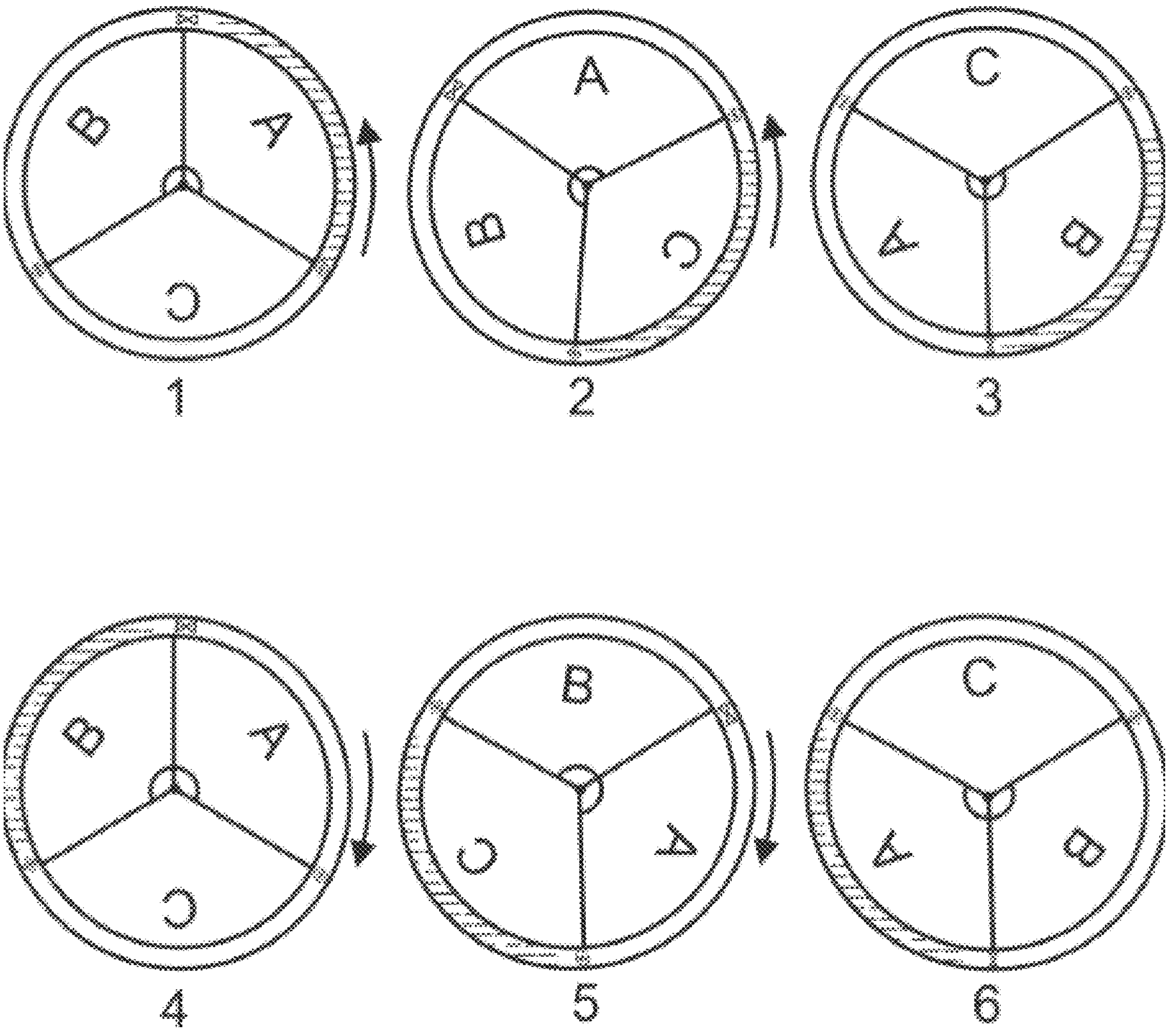
FIG. 7 shows the iterations taken by the apparatus of FIG. 6 to generate electricity.

The following is a description of the operation of second embodiment 40. FIG. 7 shows how second embodiment 40 oscillates to cause the water within circular conduit 42 to pass through first power station 48 and second power station 50. In FIG. 7, second embodiment 40 is shown in six states as it oscillates clockwise and counterclockwise. The states will be referred to as iterations. A number beneath each iteration denotes the iteration. For iterations 1 and 2, second embodiment 40 will rotate counterclockwise, while for iterations 4 and 5, second embodiment 40 will rotate clockwise. Iteration 3 shows the state of second embodiment 40 as it transitions from counterclockwise to clockwise movement, while iteration 6 shows the state of second embodiment 40 as it transitions from clockwise to counterclockwise movement. Additionally, to assist in this description, second embodiment 40 is divided into three sectors labeled A, B, and C.

Starting with iteration 1, here, second embodiment 40 is rotating counterclockwise, the valve at second power station 50 is closed, and the water is contained in sector A. Valve 52 and the valve in first power station 48 is open. At this point, the water in sector A is exerting a maximum amount of pressure on second power station 50. As second embodiment 40 transitions from iteration 1 to iteration 2, the valve in second power station 50 is opened, and water rushes through second power station 50 and into sector C to generate electricity. Simultaneously, the valve in first power station 48 is closed to prevent the water from passing through it while valve 52 remains open. At iteration 2, second embodiment 40 is still rotating counterclockwise, the valve at first power station 48 is closed, and the water is contained in sector C. Valve 52, and the valve in second power station 50 are open. At this point, the water in sector C is exerting a maximum amount of pressure on first power station 48. As second embodiment 40 transitions from iteration 2 to iteration 3, the valve in first power station 48 is opened, and water rushes through first power station 48 and into sector B to generate electricity. Simultaneously, valve 52 is closed to prevent the water from passing through sector B and into sector A while first power station 48 remains open. Iteration 3 shows the position of second embodiment 40 when it changes from rotating counterclockwise to clockwise. Here, valve 52 is closed, and the water is contained in sector B. The valves in first power station 48 and second power station 50 are open. The weight of the water against valve 52 encourages second embodiment 40 to rotate clockwise. As second embodiment 40 transitions from iteration 3 to iteration 4, valve 52 opens, and the valve in first power station 48 closes so that the water remains contained in sector B as second embodiment 40 rotates 180 degrees clockwise. At iteration 4, second embodiment 40 is rotating clockwise, the valve at first power station 48 is closed, and the water is contained in sector B. Valve 52 and the valve in second power station 50 are open. At this point, the water in sector B is exerting a maximum amount of pressure on first power station 48. As second embodiment 40 transitions from iteration 4 to iteration 5, the valve in first power station 48 is opened, and water rushes through first power station 48 and into sector C to generate electricity. Simultaneously, the valve in second power station 50 is closed to prevent the water from passing through sector C and into sector A while valve 52 remains open. At iteration 5, second embodiment 40 is rotating clockwise, the valve at second power station 50 is closed, and the water is contained in sector C. Valve 52, and the valve in first power station 48 are open. At this point, the water in sector C is exerting a maximum amount of pressure on second power station 50. As second embodiment 40 transitions from iteration 5 to iteration 6, the valve in second power station 50 is opened, and water rushes through second power station 50 and into sector A to generate electricity. Simultaneously, valve 52 is closed to prevent the water from passing through sector A and into sector B while second power station 50 remains open. Iteration 6 shows the position of second embodiment 40 when it transitions from rotating clockwise to counterclockwise. Here, valve 52 is closed, and the water is contained in sector A. The valves in first power station 48 and second power station 50 are open. The weight of the water against valve 52 causes second embodiment 40 to stop rotating clockwise and to rotate counterclockwise. As second embodiment 40 transitions from iteration 6 to iteration 1, valve 52 opens, and the valve in second power station 50 closes so that the water remains contained in sector A as second embodiment 40 rotates 180 degrees counterclockwise. At this point, the process starts again at iteration 1.

Table 1 shows a state table containing the state of valve 52, first power station 48, and second power station 50 at each iteration and transition between iterations. The keyword "Open" indicates that the valve is in the open state. The keyword "Closed" indicates that the valve is in the closed state. The keyword "Opens" indicates that the value is transitioning from a closed to an open state. The keyword "Closes" indicates that the value is transitioning from an open state to a closed state. The keyword "Open/Power" indicates that the valve is open and that water is moving through the respective turbine and generating power.

TABLE 1

A table containing the states of valve 52 and the valves in first power station 48, and second power station 50 at each iteration and transition between iterations.

| Iteration | First Power Station 48 | Second Power Station 50 | Valve 52 |
|---|---|---|---|
| 1 | Open | Closed | Open |
| 1 to 2 | Closes | Opens | Open |
| 2 | Closed | Open/Power | Open |
| 2 to 3 | Opens | Open | Closes |
| 3 | Open/Power | Open | Closed |
| 3 to 4 | Closes | Open | Opens |
| 4 | Closed | Open | Open |
| 4 to 5 | Opens | Closes | Open |
| 5 | Open/Power | Closed | Open |
| 5 to 6 | Open | Opens | Closes |
| 6 | Open | Open/Power | Closed |
| 6 to 1 | Open | Closes | Opens |

Figure 8:
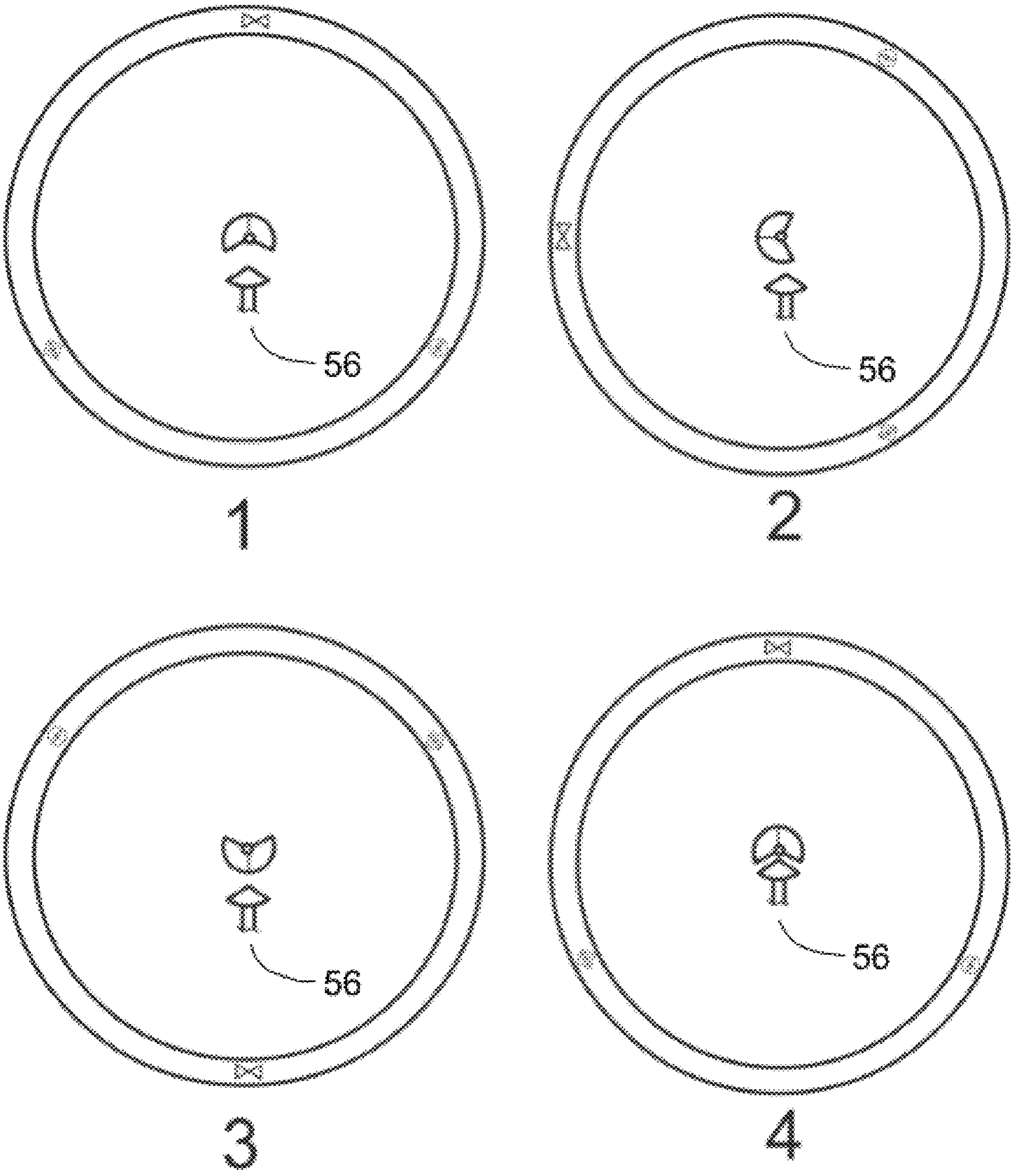
FIG. 8 shows an alternative to the second embodiment of FIG. 6, in which a wedge returns the counterweights to their original position.

The sequence of iterations as described makes use of the water to lift counterweight 46 from its resting position, that is below central axis 44, to its working position, that is above central axis 44. Other novel means are available to move counterweight 46 from its resting position to its working position. One such means that may be used with second embodiment 40 is press 56 shown in FIG. 8. In FIG. 8, second embodiment 40 is shown rotating counterclockwise, and counterweight 46 is divided into two equal halves. In iteration 1, counterweight 46 is in its working position. A rotation in either direction will start counterweight 46 to fall, thereby using its kinetic energy to assist in rotating second embodiment 40. In iteration 2, second embodiment 40 has rotated 90 degrees and counterweight 46 is kinetically assisting in the rotation of second embodiment 40. In iteration 3, second embodiment 40 has rotated 180 degrees and counterweight 46 is in its resting position. That is, counterweight 46 no longer has any kinetic energy. To lift counterweight 46 so that it may regain its potential energy, press 56 is used. In iteration 4, press 56 is lifted against counterweight 46 to engage the joint where the two halves of counterweight 46 come together. As press 56 is lifted against counterweight 46, the halves of counterweight 46 come apart and are lifted so that they rejoin above central axis 44, returning counterweight 46 back to its working position.

Figure 9:
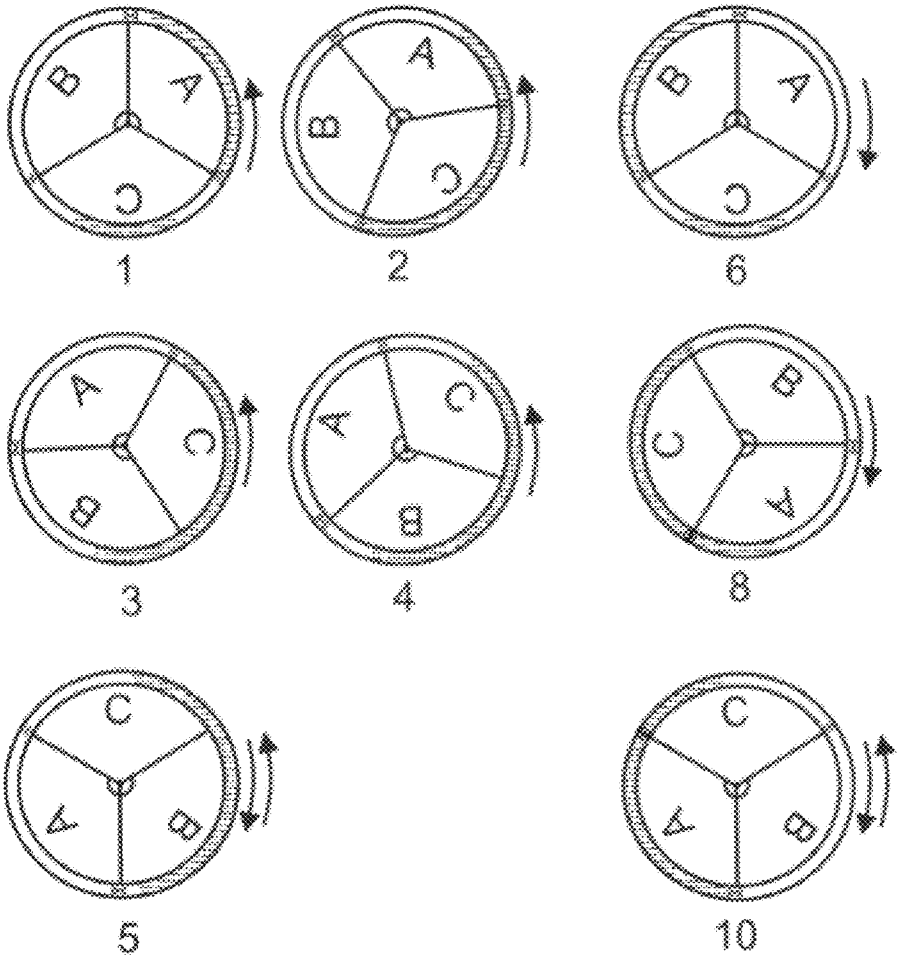
FIG. 9 shows an alternative to the second embodiment of FIG. 6, wherein water in separate sectors assists in the rotation.

FIG. 9 describes a secondary description of the operation of first power station 48 that uses water to assist in lifting counterweight 46 back to its working position that is similar to the description of the operation given in FIG. 7. FIG. 9 shows how second embodiment 40 oscillates to cause the water within circular conduit 42 pass through first power station 48 and second power station 50. In FIG. 9, second embodiment 40 is shown in ten states as it oscillates counterclockwise and clockwise. The states will be referred to as iterations. A number beneath each iteration denotes the iteration. For iterations 1 through 4, second embodiment 40 will rotate counterclockwise, while for iterations 6 through 9, second embodiment 40 will rotate clockwise. Iteration 5 shows the state of second embodiment 40 as it transitions from counterclockwise to clockwise movement, while iteration 10 shows the state of second embodiment 40 as it transitions from clockwise to counterclockwise movement. Additionally, to assist in this description, second embodiment 40 is divided into three sectors labeled A, B, and C.

Starting with iteration 1, here, second embodiment 40 is rotating counterclockwise, the valve at second power station 50 is closed, and the water is contained in sector A. Additional water will also be found in sector C, resting at the bottom of circular conduit 42. Valve 52 is continuously closed, and the valve in first power station 48 is open. At this point, the water in sector A is exerting a maximum amount of pressure on second power station 50. As second embodiment 40 transitions from iteration 1 to iteration 2, the valve in second power station 50 is opened, and water rushes through second power station 50 and into sector C to join with the water existing in sector C and to generate electricity. During iterations 2 through 4, second embodiment 40 continues to rotate counterclockwise and water will pass first through the turbine in second power station 50 and then through the turbine in first power station 48 until second embodiment 40 arrives at the position in iteration 5. This represents the maximum counterclockwise rotation of second embodiment 40. At this point, counterweight 46 is in its resting position, and the water is applying great force upon valve 52. This force will assist second embodiment 40 in its transition from rotating counterclockwise to clockwise. As second embodiment 40 transitions from iteration 5 to iteration 6, the valve in first power station 48 is closed, and second embodiment 40 rotates 180 degrees clockwise to arrive at iteration 6. Iteration 6 is the opposite of iteration 1, but here, second embodiment 40 is rotating clockwise, the valve at first power station 48 is closed, and the water is contained in sector B. Additional water will also be found in sector C, resting at the bottom of circular conduit 42. Valve 52 is continuously closed and the valve in second power station 50 is open. At this point, the water in sector B is exerting a maximum amount of pressure on first power station 48. As second embodiment 40 transitions from iteration 6 to iteration 7, the valve in first power station 48 is opened, and water rushes through first power station 48 and into sector C to join with the water existing in sector C and to generate electricity. During iterations 7 through 9, second embodiment 40 continues to rotate clockwise, and water will pass first through the turbine in first power station 48 and then through the turbine in second power station 50 until second embodiment 40 arrives at the position in iteration 10. This represents the maximum clockwise rotation of second embodiment 40. At this point, counterweight 46 is in its resting position, and the water is applying great force upon valve 52. This force will assist second embodiment 40 in its transition from rotating clockwise to counterclockwise. As second embodiment 40 transitions from iteration 10 back to iteration 1, the valve in second power station 50 is closed, and second embodiment 40 rotates 180 degrees counterclockwise to arrive at iteration 1, and the process repeats.

Figure 10:
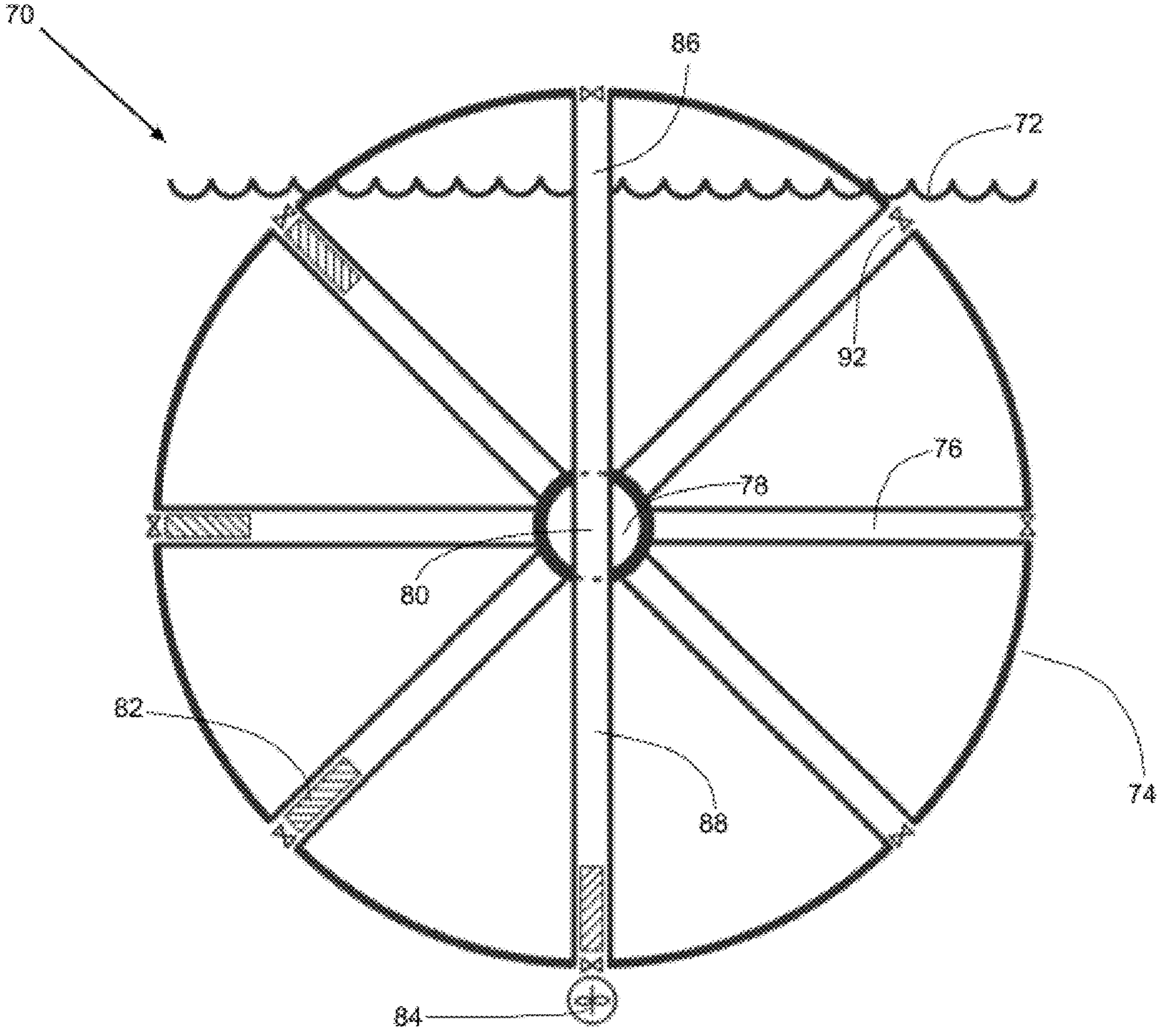
FIG. 10 shows the third embodiment of an apparatus that generates electricity using hydrokinetic energy.

FIG. 10 shows another secondary embodiment of the apparatus to create hydrokinetic energy identified as third embodiment 70. Third embodiment 70 is similar to first embodiment 10 in that it also appears as a wheel, but circular conduit 12, being a single conduit that composes the outermost ring of first embodiment 10, is replaced by the conduit spokes referenced as conduit 76. Additionally, third embodiment 70, for the most part, is immersed in a body of water, as shown by water line 72. FIG. 10 shows third embodiment 70 with an arrangement of eight conduit 76, and third embodiment 70 will function with any even number count of conduit 76. Each conduit 76 has valve 92 in its distal end. Valve 92 allows for the ingress or egress of water or air in conduit 76. Support ring 74 may be used to structurally support the outside end of conduit 76 while central axis 78 is used to support the inside end of conduit 76. One who has skill in the art may devise means of structurally supporting conduit 76 of third embodiment 70. Third embodiment 70, when in operation, rotates either clockwise or counterclockwise about central axis 78. Within central axis 78, is found channel 80. Channel 80 connects the two vertically aligned conduit 76, uppermost conduit 86 and lowermost conduit 88, together as shown in FIG. 10. In a consecutive half of conduit 76, there exists plunger 82 that may transverse the entire length of conduit 76. As third embodiment 70 rotates, conduit 76 containing plunger 82 will approach the top peak of third embodiment 70, the position of uppermost conduit 86. At this position, plunger 82 is released and allowed to move downward towards lowermost conduit 88. As plunger 82 moves downwards towards lowermost conduit 88, it will pass through channel 80. Channel 80 is always oriented vertically to allow uppermost conduit 86 to structurally connect with lowermost conduit 88, thus providing a continuous path for plunger 82 to move through as it progresses downward. Simultaneously, with plunger 82 downward movement, water is pressed out of lowermost conduit 88 and through turbine 84, thereby generating electricity. While third embodiment 70 rotates, valve 92 may open or close to control the movement of water flowing into or out of each conduit 76. Additionally, as third embodiment 70 rotates, plunger 82 will be carried upwards towards the peak of third embodiment 70. As the one or more plunger 82 are being carried upwards, water is allowed to flow into one or more conduit 76 found opposite the plungers by opening valve 92. In so doing, the water acts as a counterbalance to assist third embodiment 70 in rotating clockwise. When a conduit 76 rotates into uppermost conduit 86, it is joined to the conduit 76 that simultaneously rotates into lowermost conduit 88 by channel 80. The alignment of uppermost conduit 86, channel 80, and lowermost conduit 88 to form a compound conduit wherein each element is in fluid communication with one another. Upon arriving at this position, valve 92 of both lowermost conduit 88 and uppermost conduit 86 will open. This will cause water to flow into the compound conduit while passing through turbine 84, thereby generating electricity. When the compound conduit is full of water, plunger 82, found at the top of the compound conduit, will begin to move downwards. As plunger 82 moves downwards, water is ejected from the compound conduit and will pass through turbine 84, thereby generating electricity.

Figure 11:
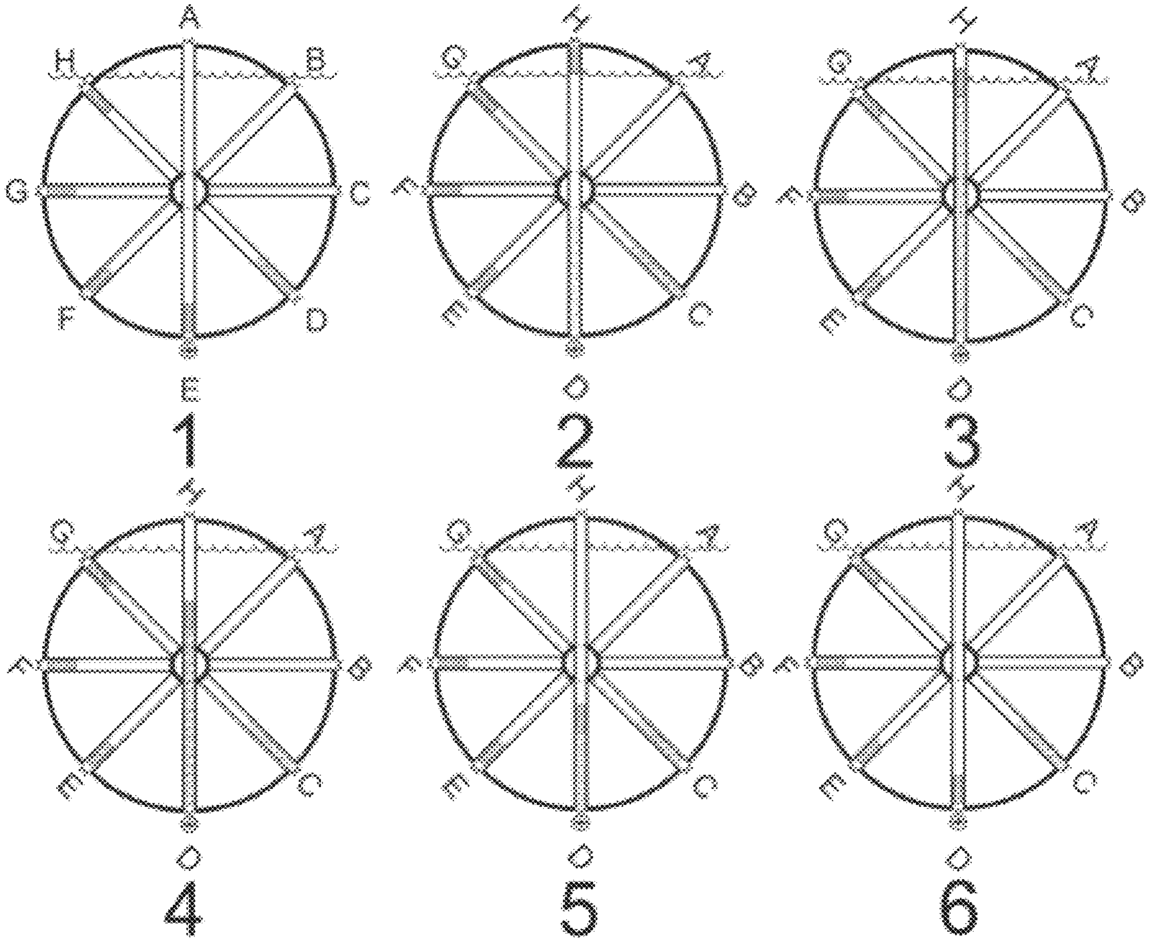
FIG. 11 shows the iterations taken by the apparatus of FIG. 10 to generate electricity.

The sequence described above is illustrated in FIG. 11, which shows the activity undertaken by third embodiment 70 with the rotation of one conduit of third embodiment 70 into the position of its preceding conduit. In FIG. 11, the activity undertaken is divided into six iterations as identified by the number below each third embodiment 70. In iteration 1, third embodiment 70 is shown in the state after third embodiment 70 has completed a cycle of generating electricity, its initial state. In this state, plunger 82 found in uppermost conduit 86 has advanced to the bottom of lowermost conduit 88, valve 92 in all of the conduits are closed, and conduit 76 in position D contains water that acts as a counterbalance to the plungers found on the opposing side of third embodiment 70. As third embodiment 70 begins to rotate into iteration 2, valve 92 opens in conduit 76 in position C to allow water to enter. Water within conduit 76 in positions C and D will act to counterbalance plunger 82 found on the opposite side of third embodiment 70. Once third embodiment 70 is in iteration 2, valve 92 in conduit 76 in position C is closed so that it may act as a counterweight and conduit 76 in positions D and H are in fluid communications with each other by means of channel 80 forming the compound conduit. At this point, valve 92 of uppermost conduit 86 and lowermost conduit 88 are opened, and water will enter lowermost conduit 88 through turbine 84, thereby generating electricity. After the water has filled both uppermost conduit 86 and lowermost conduit 88, as shown in iteration 3, plunger 82 found in uppermost conduit 86 will be released and begin to move downwards to eject water from both uppermost conduit 86 and lowermost conduit 88. The water being ejected passes through turbine 84, thereby generating electricity in the reverse polarity from when water was drawn into the compound conduit. This is depicted in iterations 4 and 5. In iteration 6, plunger 82 has advanced fully to the bottom of the compound conduit, forcing all of the water out of both uppermost conduit 86 and lowermost conduit 88. Iteration 6 is the same as iteration 1 except that third embodiment 70 has advanced by one conduit 76. In iteration 6, plunger 82 is attached to support ring 74 so that as support ring 74 rotates, plunger 82 will eventually return to the peak position of uppermost conduit 86 to be repeatedly used to eject water from both uppermost conduit 86 and lowermost conduit 88.

Figure 12:
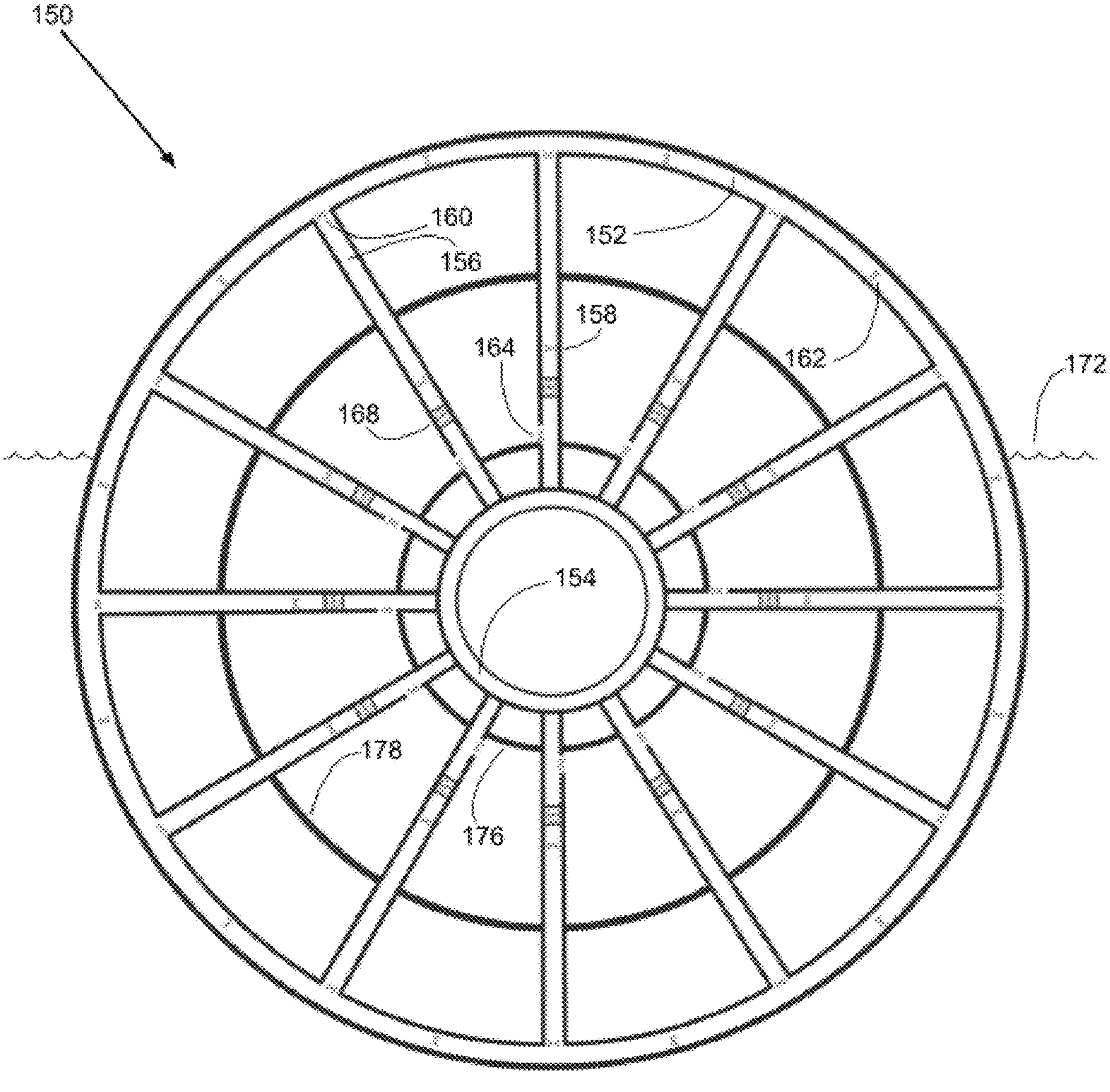
FIG. 12 shows a fourth embodiment of an apparatus that generates electricity using hydrokinetic energy.

FIG. 12 shows fourth embodiment 150 of the apparatus to generate hydrokinetic energy. Fourth embodiment 150 has the appearance of a wheel from a horse carriage, having a central hub, a plurality of spokes radiating outward from the central hub, and an outer support ring. In FIG. 12, fourth embodiment 150 is shown as having a central hub comprising inner conduit 154 from which one or more spoke 156 originate therefrom and outer support ring 152 to which each spoke 156 terminates. It is not necessary that spoke 156 terminates at outer support ring 152. Fourth embodiment 150 may be configured such that spoke 156 extends beyond outer support ring 152. To structurally support fourth embodiment 150 and the one or more spoke 156, fourth embodiment 150 may utilize one or more support rings shown as mid support ring 178 and inner support ring 176 in FIG. 12. Each spoke 156 has within inner valve 158, turbine 168, outer valve 160, and water valve 164, and are equally spaced about. Fourth embodiment 150 may be divided into twelve equally spaced sectors, where each sector contains a spoke 156. FIG. 12 shows 12 sectors, but fourth embodiment 150 may have a varying number of sectors. FIG. 12 also shows conduit valve 162 arranged on the boundary of each sector within outer support ring 152. The apparatus of fourth embodiment 150 is immersed in a body of water up to water line 172, and for optimal operations, the body of water is substantial.

Figure 13:
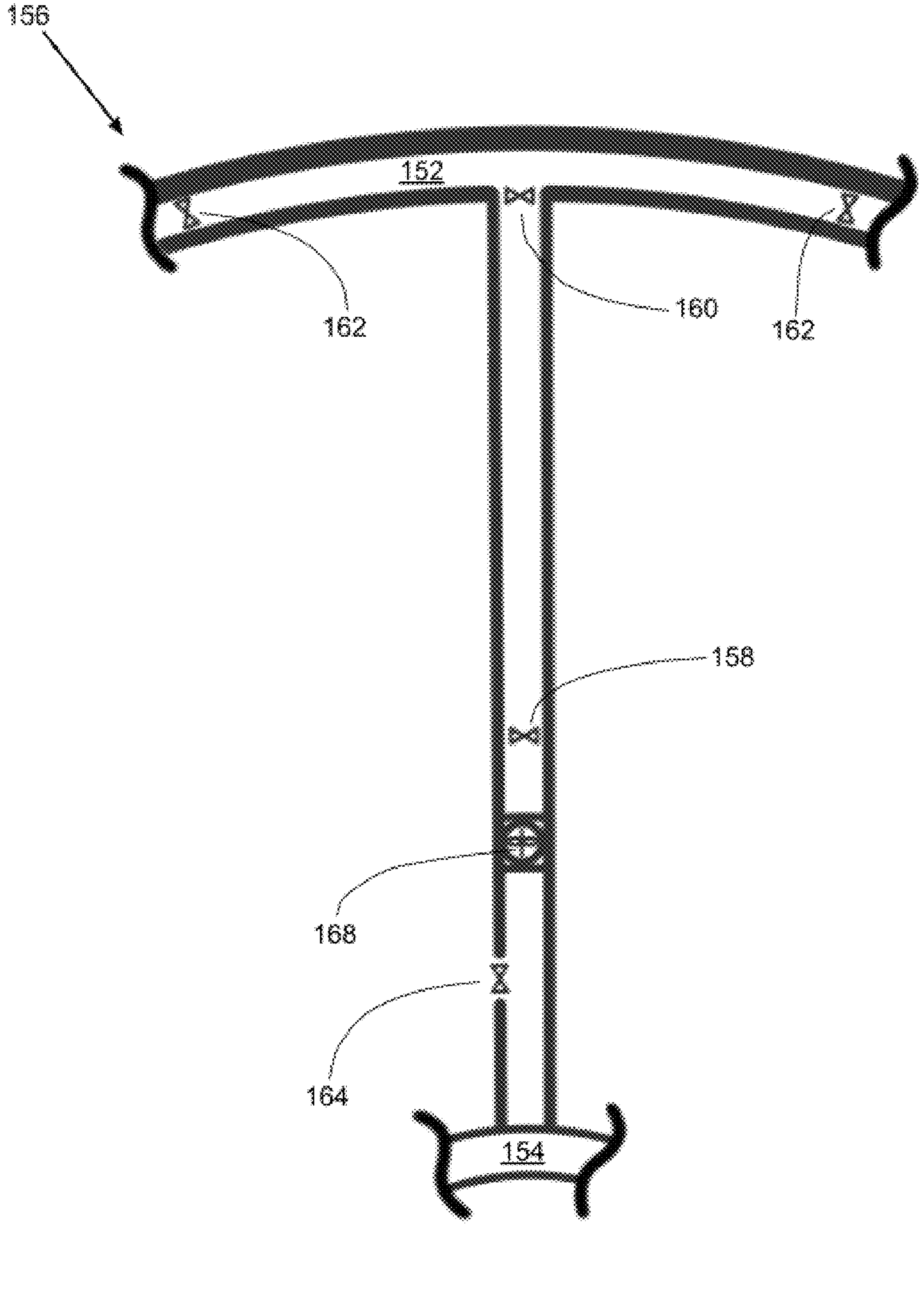
FIG. 13 shows a detailed view of a single spoke from the embodiment of FIG. 12.

FIG. 13 shows a detailed view of one of the twelve spoke 156 present in fourth embodiment 150. Outer support ring 152 and inner conduit 154 are shown partially, with spoke 156 shown in its entirety. Within spoke 156 are shown water valve 164, inner valve 158, outer valve 160, and conduit valve 162 along with turbine 168. The purpose of water valve 164 is to control the flow of water into or out of spoke 156. As fourth embodiment 150 turns, spoke 156 will at some time pass beneath the surface of water line 172. When spoke 156 is beneath water line 172, water valve 164 will open to allow water to enter spoke 156. As water fills spoke 156, the water will pass through turbine 168 and generate electricity. To facilitate the displacement of air as water fills spoke 156, inner valve 158, outer valve 160, and conduit valve 162 will open, allowing air to flow out of spoke 156 as it fills with water. As fourth embodiment 150 continues to turn, spoke 156 will drop further beneath the water. As spoke 156 begins to fill with water, conduit valve 162 and outer valve 160 will close, confining the water to spoke 156 and filling it. Once spoke 156 is full of water, inner conduit 154 and water valve 164 are closed, sealing spoke 156. As fourth embodiment 150 continues to turn, spoke 156 is lifted out of the water. Once spoke 156 has been lifted to a certain angular position nearing 90 degrees, inner valve 158 and water valve 164 are opened, allowing gravity to act on the water contained within spoke 156. As a result, water within spoke 156 will flow through turbine 168 to generate electricity until spoke 156 is empty. By this time, spoke 156 is once again approaching water line 172, and the process repeats. In yet another embodiment of fourth embodiment 150, rather than fourth embodiment 150 rotating continuously in one angular direction, fourth embodiment 150 may angularly rotate a certain number of degrees clockwise and then rotate the same number of degrees counterclockwise. In still another embodiment, certain spoke 156 may be permanently filled during operations to act as a counterweight to facilitate the rotational movements of fourth embodiment 150. More than one spoke 156 may be permanently filled during operations to facilitate the rotational movements of fourth embodiment 150, and these filled spoke 156 may reside adjacent to each other. In yet another embodiment, spoke 156 does not have a uniform diameter so that the distal end of spoke 156 may have a greater circumference than the proximal end of spoke 156. In this manner, spoke 156 is capable of storing more water than the spokes of fourth embodiment 150 shown in FIG. 12 and FIG. 13. In yet another embodiment, spoke 156 may divide into two or more conduits at the distal end of turbine 168 to increase the capacity of water that may be held by spoke 156. One with ordinary skill in the art may alter the configuration and operation of fourth embodiment 150 while keeping within the spirit of this disclosure.

Figure 14:
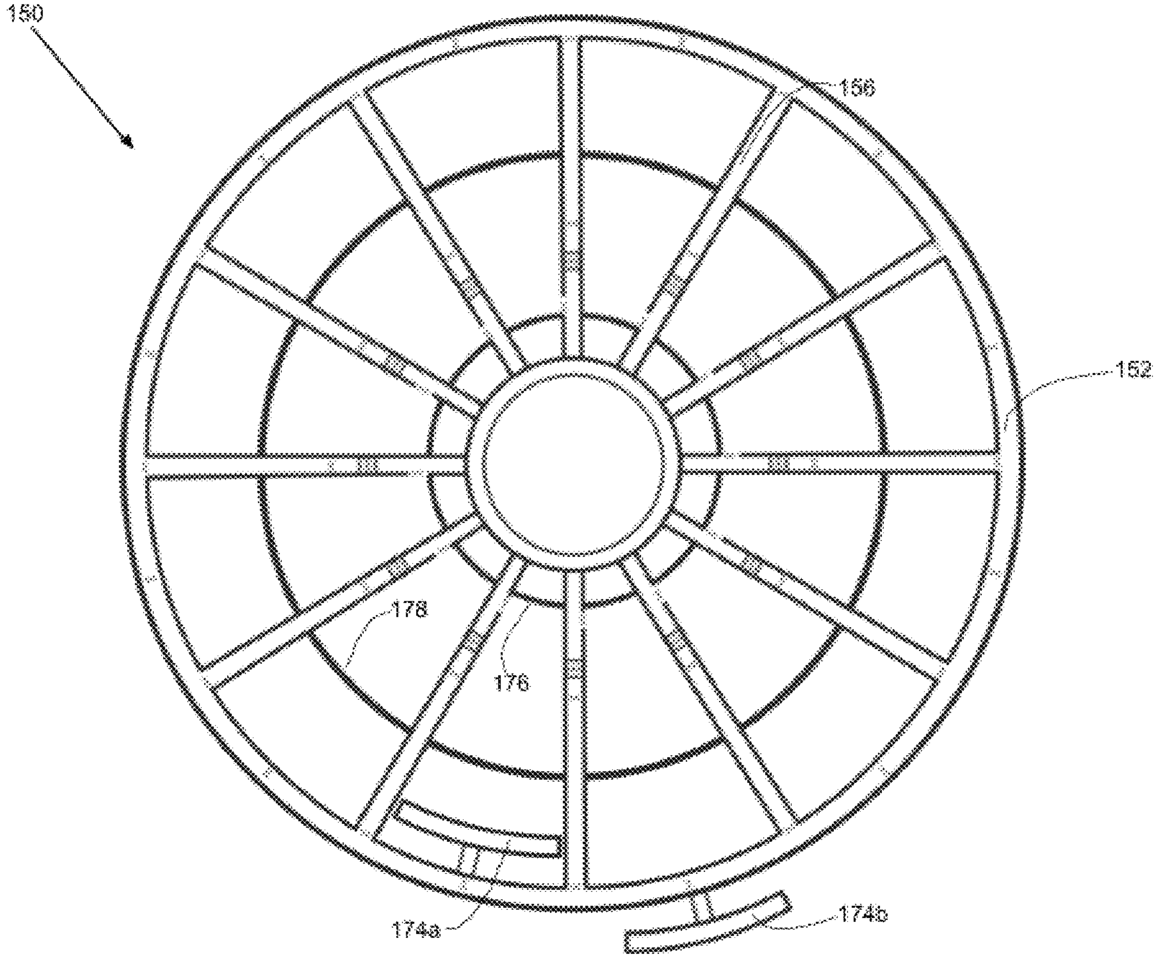
FIG. 14 shows a view of the embodiment of FIG. 12, which further comprises counterweights inside and outside the outer circumference.

A counterweight may be used in any wheel-like embodiments disclosed herein to assist the wheel while rotating to lift conduits containing water. Using counterweights will save energy and reduce wear and tear on the wheel. FIG. 14 shows fourth embodiment 150 of the apparatus to generate hydrokinetic energy, but with the addition of counterweights. Counterweight 174 may reside solely within outer support ring 152 or extend beyond outer support ring 152, and may reside anywhere in between. Additionally, one or more spoke 156 may be filled to function as a counterweight rather than being used to generate electricity from hydrokinetic energy. The counterweights shown in FIG. 14 are illustrative only. Counterweights may vary in size or shape from what is shown in FIG. 14. In FIG. 14, two counterweights are shown; counterweight **174*a* shows a counterweight that is within the circumference of outer support ring 152 while counterweight 174*b* shows a counterweight that is outside the circumference of outer support ring 152. The counterweights shown in FIG. 14 are static, that is, they do not change their orientation or position as fourth embodiment 150** rotates.

Figure 15:
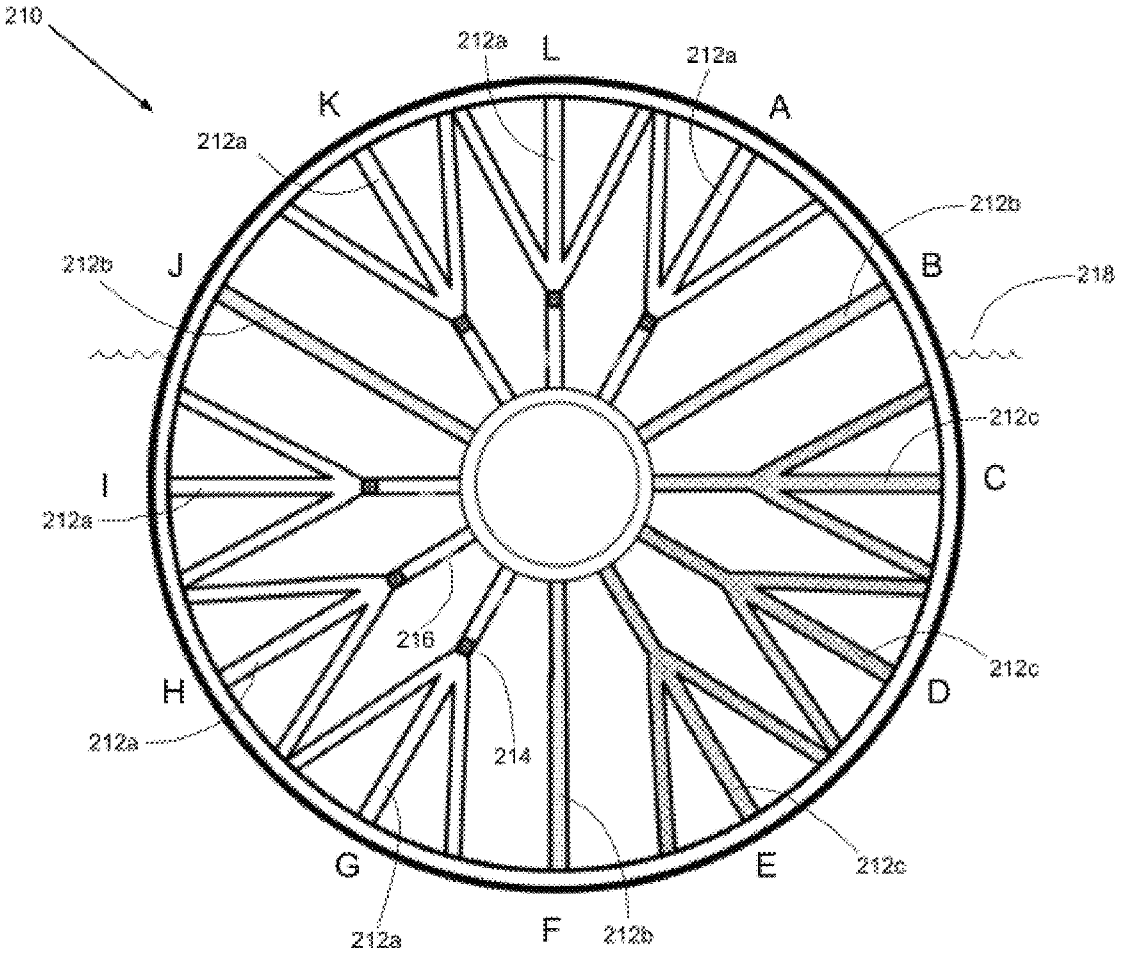
FIG. 15 shows the preferred embodiment of an apparatus that generates electricity using hydrokinetic energy.

FIG. 15 shows preferred embodiment 210 representing an alternate configuration of fourth embodiment 150. Preferred embodiment 210 generates electricity by oscillating back and forth between two angular positions rather than a constant rotational movement. Spoke 212 in preferred embodiment 210 are configured in three ways. Generator spoke **212*a* found in sectors G, H, I, K, L, and A generate electricity in a manner analogous to fourth embodiment 150 as discussed above. In fourth embodiment 150, electricity is generated when one of the many spoke 156 is rotated beneath water line 172. At this point, water valve 164 and inner valve 158 open to allow water to enter spoke 156. Water entering spoke 156 passes through turbine 168, thereby generating electricity. As spoke 156 is rotated out of the water, water valve 164 and inner valve 158 close and reopen when spoke 156 is rotated to an angle approaching 90 degrees. Electricity is then generated as water passes through turbine 168 while exiting through inner valve 158 and water valve 164. As fourth embodiment 150 continues rotating, spoke 156 will again rotate beneath water line 172 to collect water and the process repeats itself. In FIG. 15, generator spoke 212***a* found in sectors G, H, I, K, L, and A only show what is minimally required, that is turbine 214 and water valve 216. The remaining valves are not shown to improve clarity. Additionally, generator spoke 212*a* found in sectors G, H, I, K, L, and A have three water storage conduits beyond turbine 214. These additional water storage conduits allow for a greater volume of water to pass through turbine 214 and thus generate a greater amount of electricity. Support spoke 212*b*, found in sectors B, F, and J, are used to support the structure of preferred embodiment 210 and to give the structure greater rigidity. These spokes do not contain any valves or turbines. Counterweight spoke 212*c* found in sectors C, D, and E are weighted. They may be equipped with water valve 216 and turbine 214 to allow them to be used as generator spoke 212*a* found in sectors G, H, I, K, L, and A, but in preferred embodiment 210 they are weighted and act as a counterweight. If equipped with water valve 216 and turbine 214, they are filled with water and remain filled while preferred embodiment 210 is in operation. If not equipped with water valve 216 and turbine 214, they are permanently filled with some material to be weighted.

Figure 16:
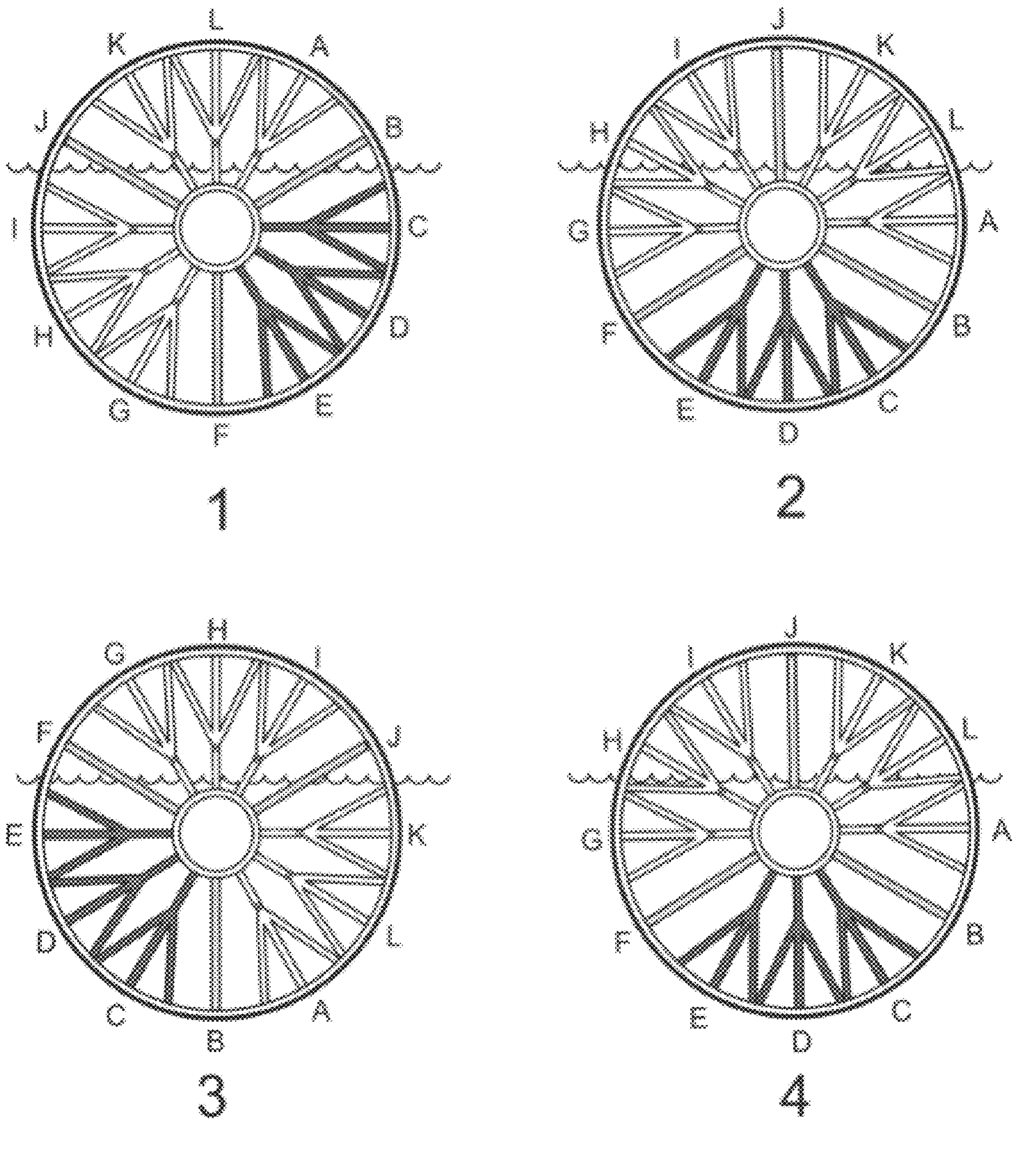
FIG. 16 shows the iterations taken by the apparatus of FIG. 15 to generate electricity.

FIG. 16 shows the iterations that preferred embodiment 210 uses to generate electricity. Preferred embodiment 210 uses a "rocking" motion to generate electricity from the movement of water by rotating 120 degrees in the clockwise direction and then 120 degrees in the counterclockwise direction. FIG. 16 also shows the water line at each iteration. At iteration 1 and when first starting, generator spoke 212*a* at sectors G, H, and I will have water valve 216 opened, allowing water to enter and pass through turbine 214 and generate electricity. If entering iteration 1 from iteration 4, generator spoke 212*a* at sectors K, L, and A will also have water valve 216 opened, allowing water to exit and pass through turbine 214 and generate electricity. As preferred embodiment 210 turns clockwise another 60 degrees towards iteration 2, preferred embodiment 210 will receive rotational assistance from counterweight spoke 212*c* in sectors C, D, and E. As generator spoke 212*a* in sectors G, H, and I are lifted above the waterline, they will close water valve 216. As generator spoke 212*a* in sectors K, L, and A are lowered beneath the waterline, they will open water valve 216, allowing water to enter and pass through turbine 214 and generate electricity as a result. As preferred embodiment 210 continues to rotate clockwise towards iteration 3, generator spoke 212*a* in sectors G, H, and I will open water valve 216 to allow water to pass through turbine 214 while exiting the spoke and generate electricity. Simultaneously, generator spoke 212*a* in sectors K, L, and A will open water valve 216 to allow water to pass through turbine 214 while entering the spoke and generate electricity. Iteration 3 represents the peak clockwise rotational movement of preferred embodiment 210 and, at this point, stops rotating clockwise and begins to rotate counterclockwise. This transition is assisted by counterweight spoke 212*c* in sectors C, D, and E. As preferred embodiment 210 rotates counterclockwise to iteration 4, generator spoke 212*a* at sectors K, L, and A will close water valve 216 as they are lifted above water line 218. Counterweight spoke 212*c* at sectors C, D, and E will assist in lifting generator spoke 212*a* in sectors K, L, and A. Simultaneously, generator spoke 212*a* at sectors G, H, and I will open water valve 216 as they approach water line 218 to allow water to enter. As preferred embodiment 210 continues to rotate counterclockwise from iteration 4 back to iteration 1, generator spoke 212*a* at sectors K, L, and A will open water valve 216, allowing water to exit while passing through turbine 214 and generate electricity. Simultaneously, spoke 212 in sectors G, H, and I will open water valve 216, allowing water to enter and pass through turbine 214 to generate electricity. Iteration 1 represents the peak counterclockwise rotational movement of preferred embodiment 210 and, at this point, stops rotating counterclockwise and begins to rotate clockwise. This transition is assisted by counterweight spoke 212*c* in sectors C, D, and E.

Figure 17:
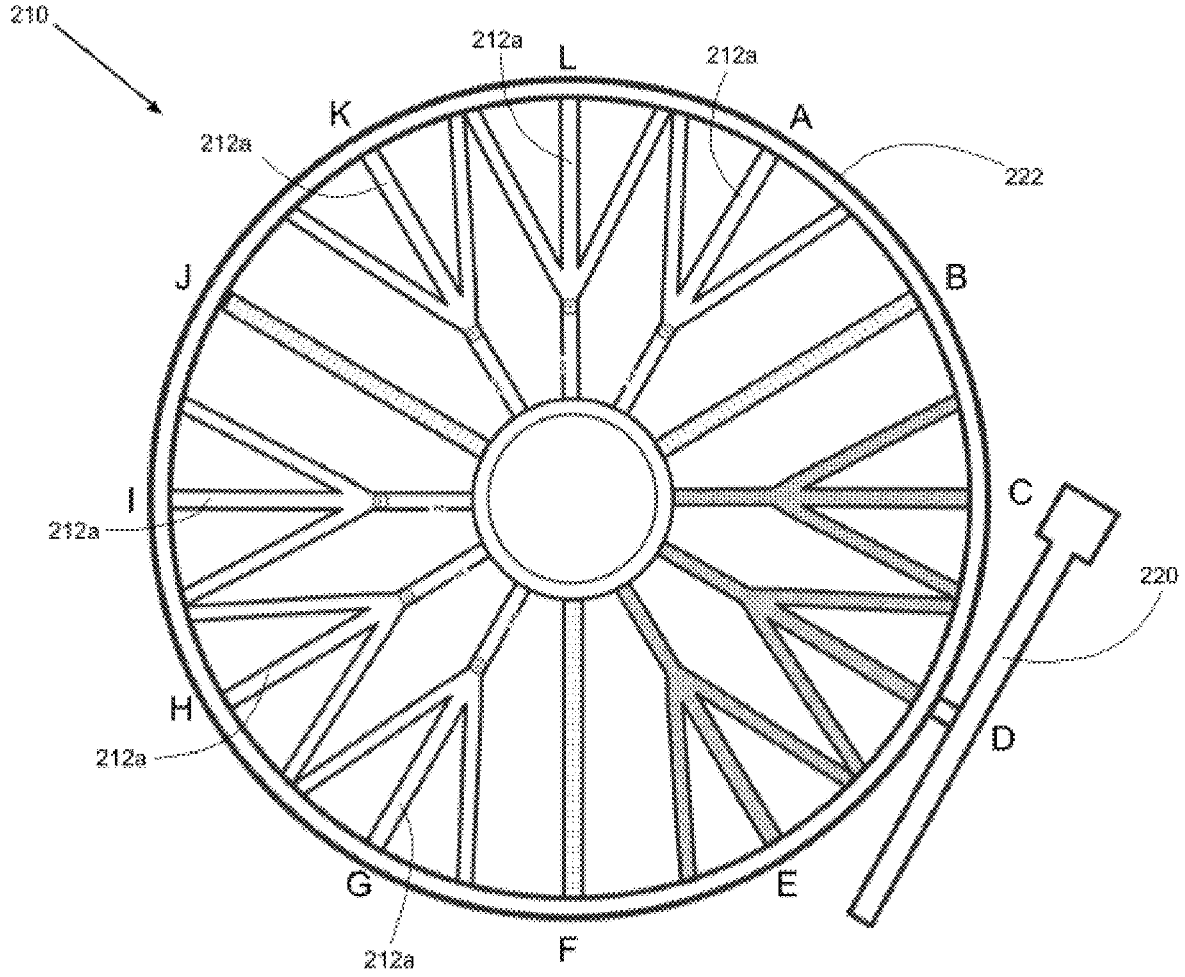
FIG. 17 shows the apparatus of FIG. 15, which has a dynamic counterweight outside its outer circumference that changes its orientation depending upon the angular position of the apparatus.

FIG. 17 shows a dynamic counterweight that changes its orientation as the wheel rotates. In FIG. 17, counterweight 220 resides just beyond the circumference of outer conduit 222 and is shown as being linear and tangential to the circumference of outer conduit 222, having a longitudinal axis and a lateral axis. One end of counterweight 220 is heavier than the opposing end of counterweight 220. In FIG. 17, this is represented by showing one end of counterweight 220 being thicker than the opposing end. When preferred embodiment 210 is in operation, the orientation of counterweight 220 changes so that the heavier end of counterweight 220 is positioned higher when preferred embodiment 210 begins a clockwise or counterclockwise rotation. Positioning the heavier end of counterweight 220 higher will assist preferred embodiment 210 as it begins a rotation to start the rotation and to increase the rotational speed of preferred embodiment 210 as it approaches and follows through the 6 o'clock position to minimize the amount of energy required to bring preferred embodiment 210 to its opposing end of rotation. Once preferred embodiment 210 has reached its opposing end of rotation, preferred embodiment 210 will pause so that counterweight 220 may swivel 180 degrees to bring its heavier end higher before rotating again in the opposite direction.

Figure 18:
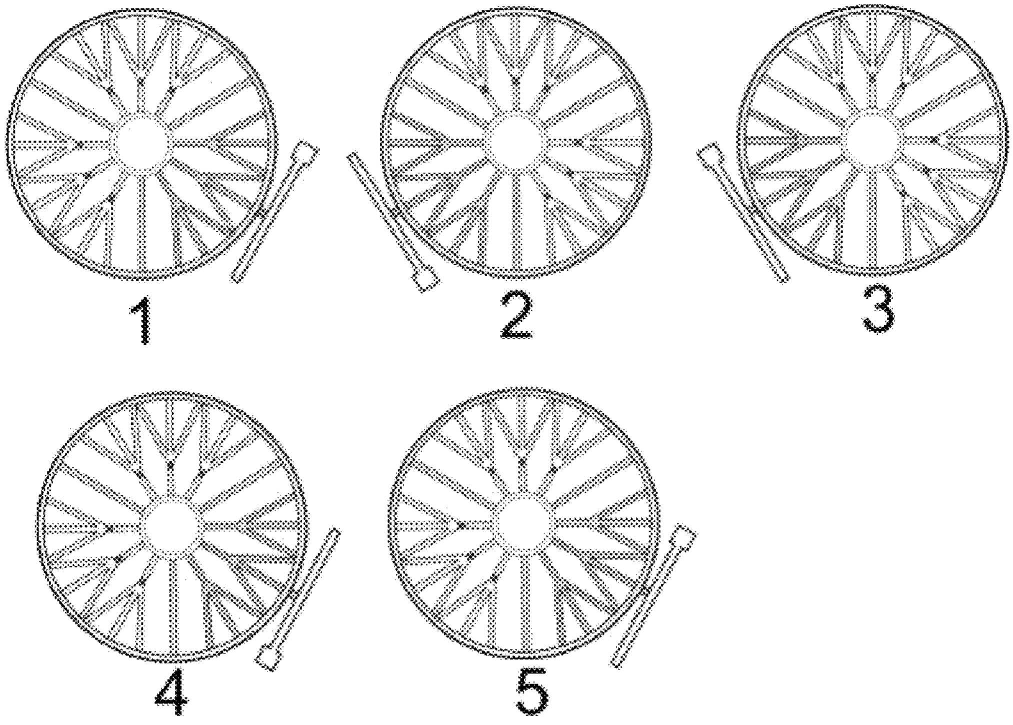
FIG. 18 shows the apparatus of FIG. 17 and how the dynamic counterweight changes its orientation depending on the apparatus's angular position.

FIG. 18 shows preferred embodiment 210 cycling through a clockwise and then a counterclockwise rotation in conjunction with counterweight 220. The sequence starts at iteration 1 where preferred embodiment 210 is paused and (i) water has flowed out of generator spoke 212*a* at sectors K, L, and A, (ii) water has filled generator spoke 212*a* at sectors G, H, and I, and (iii) counterweight 220 has swiveled so that its heavier end is higher. At this point, preferred embodiment 210 is ready to start a clockwise rotation. At iteration 2, preferred embodiment 210 has completed a clockwise movement and pauses so that (i) water may begin to flow out of generator spoke 212*a* at sectors G, H, and I, (ii) water may begin to flow into generator spoke 212*a* at sectors K, L, and A, and counterweight 220 may begin to swivel 180 degrees. At iteration 3, (i) water has completed flowing out of generator spoke 212*a* at sectors G, H, and I, (ii) water has completed flowing into generator spoke 212*a* at sectors K, L, and A, and counterweight 220 has completed swiveling 180 degrees. At this point, preferred embodiment 210 is ready to start a counterclockwise rotation. At iteration 4, preferred embodiment 210 has completed a counterclockwise movement and pauses so that (i) water may begin to flow out of generator spoke 212*a* at sectors K, L, and A, (ii) water may begin to flow into generator spoke 212*a* at sectors G, H, and I, and (iii) counterweight 220 may begin to swivel 180 degrees. At iteration 5, being the same as iteration 1, (i)

water has completed flowing out of generator spoke 212*a* at sectors K, L, and A, (ii) water has completed flowing into generator spoke 212*a* at sectors G, H, and I and counterweight 220 has completed swiveling 180 degrees. At this point, preferred embodiment 210 is ready to start a clockwise rotation.

Figure 19:
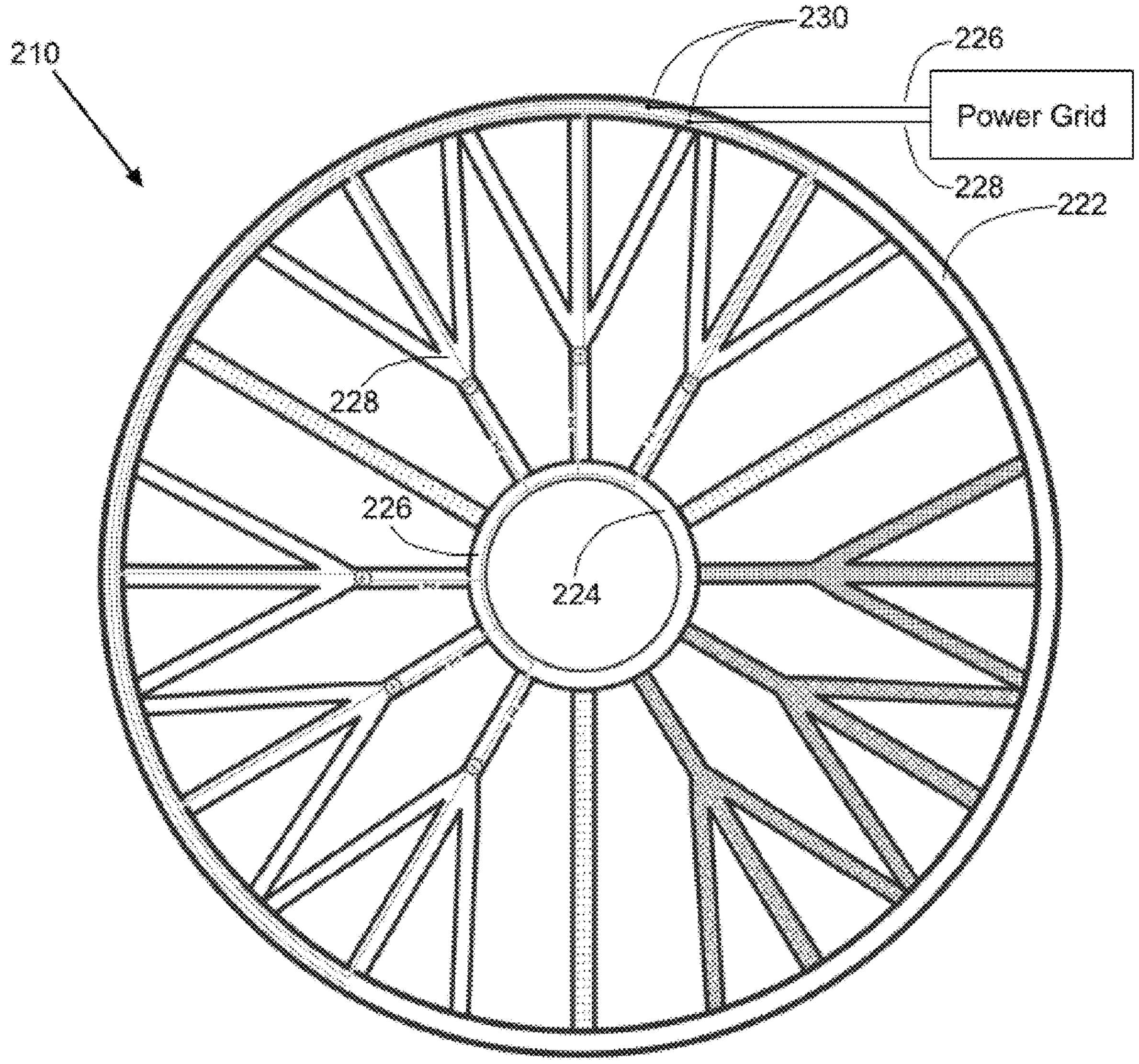
FIG. 19 shows the apparatus of FIG. 15, further showing how the electrical lines may be arranged to capture and transmit the electrical power created by the turbines to a power grid.

FIG. 19 shows how the electrical lines of preferred embodiment 210 may be arranged to capture and transmit the electrical power created by the turbines to a power grid. There may be other designs for electrical lines to capture the electricity being generated by the turbines that one with skill in the art may conceive of, and the design shown in FIG. 19 is only an example of. First embodiment 10 may further comprise outer conduit 222 and inner conduit 224. Outer conduit 222 is a conduit that encompasses the outer circumference of preferred embodiment 210 and where the distal end of each spoke 212 may be attached for support while inner conduit 224 is a conduit that encompasses the outer circumference of the central axis of preferred embodiment 210. FIG. 19 shows a pair of electrical lines, first electrical line 226 and second electrical line 228, extending from each turbine 214. First electrical line 226 connects one polarity of each turbine 214 within inner conduit 224 and then extends a line to outer conduit 222 at either extreme generator spoke 212*a*. In FIG. 19, first electrical line 226 is shown extending to outer conduit 222 at the rightmost generator spoke 212*a*. Second electrical line 228, in turn, connects the opposing polarity of each turbine 214 by extending an electrical line from each turbine 214 to outer conduit 222. Brush contacts 230 are used to transfer the electrical power from first electrical line 226 and second electrical line 228 to a power grid. It is understood that additional electrical components will need to be used to condition the electrical currents in first electrical line 226 and second electrical line 228 that one with ordinary skill in the art will use, but is not shown here for clarity.

Figure 20A:
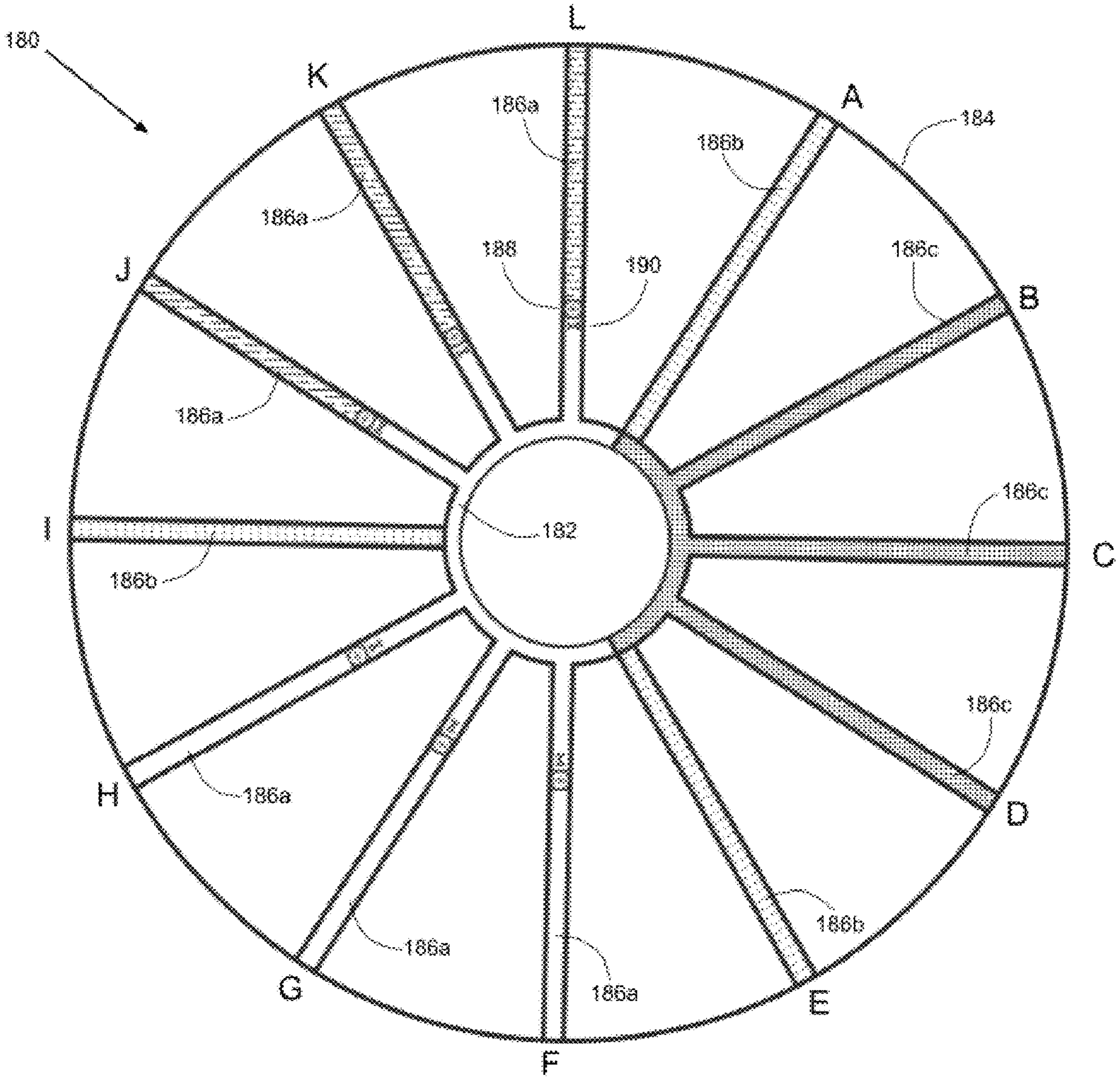
FIG. 20A shows the seventh embodiment of an apparatus that generates electricity using hydrokinetic energy when the apparatus has terminated a counterclockwise rotation and is initiating a clockwise rotation.
Figure 20B:
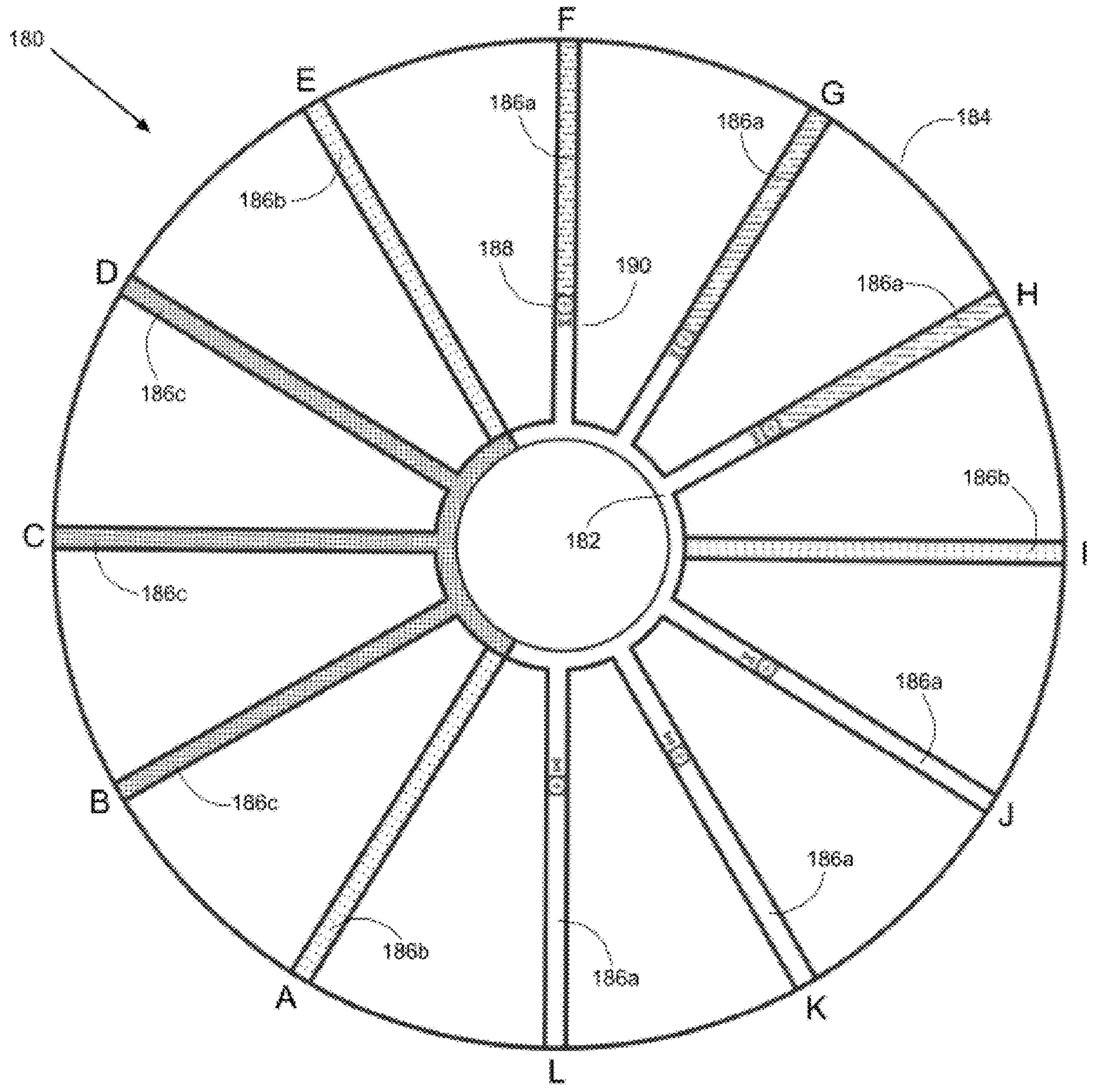
FIG. 20B shows the seventh embodiment of an apparatus that generates electricity using hydrokinetic energy when the apparatus has terminated a clockwise rotation and is initiating a counterclockwise rotation.

FIG. 20A and FIG. 20B show seventh embodiment 180 of the apparatus to generate hydroelectric energy and convert this energy into electrical energy. While similar to preferred embodiment 210, seventh embodiment 180 is self-contained and thus may be located on land or in a large body of water. The structural support elements are not shown in order to focus on the structure of the actual apparatus that is used to generate hydroelectric energy and convert this energy into electrical energy. Seventh embodiment 180 generates electricity by oscillating back and forth between two angular positions rather than a constant rotational movement. Spoke 186 in seventh embodiment 180 are configured in three ways. Spoke 186 found in sectors F, G, H, J, K, and L are used to generate electricity and are referenced as generator spoke 186*a*. Spoke 186 found in sectors A, E, and I are used to structurally support seventh embodiment 180 and are referenced as support spoke 186*b*. Spoke 186 found in sectors B, C, and D are used in combination to act as a counterweight and are referenced as counterweight spoke 186*c*. Counterweight spoke 186*c* may be comprised of separate spokes, combined into a single large spoke, or composed of a geometric shape that differs from what is shown. In FIG. 20A, seventh embodiment 180 is shown in its rightmost angular position with counterweight spoke 186*c* roughly at 90 degrees. This is a possible starting position of seventh embodiment 180 or the position after seventh embodiment 180 has completed a counterclockwise rotation and is transitioning to a clockwise rotation. At this position, generator spoke 186*a* in sectors J, K, and L has rotated into the upper half of seventh embodiment 180, and generator spoke 186*a* in sectors F, G, and H has rotated into the lower half of seventh embodiment 180. Generator spoke 186*a* in sectors J, K, and L are in fluid communications with generator spoke 186*a* in sectors F, G, and H through inner conduit 182. Valve 190 found in generator spoke 186*a* of sectors J, K, and L are in the closed position, retaining a column of water in their respective generator spoke 186*a*. Valve 190 found in generator spoke 186*a* of sectors F, G, and H are in the open position and ready to receive water from generator spoke 186*a* in sectors J, K, and L. In FIG. 20B, seventh embodiment 180 is shown in its leftmost angular position with counterweight spoke 186*c* roughly at 270 degrees. This is a possible starting position of seventh embodiment 180 or the position after seventh embodiment 180 has completed a clockwise rotation and is transitioning to a counterclockwise rotation. At this position, generator spoke 186*a* in sectors F, G, and H has rotated into the upper half of seventh embodiment 180, and generator spoke 186*a* in sectors J, K, and L has rotated into the lower half of seventh embodiment 180. Valve 190 found in generator spoke 186*a* of sectors F, G, and H are in the closed position, retaining a column of water in their respective generator spoke 186*a*. Valve 190 found in generator spoke 186*a* of sectors J, K, and L are in the open position and ready to receive the water retained in generator spoke 186*a* of sectors F, G, and H.

To create hydroelectric energy, seventh embodiment 180 may initially start as shown in FIG. 20A. Here, seventh embodiment 180 is at its rightmost angular position, and counterweight spoke 186*c* are in a position to assist in rotating seventh embodiment 180 clockwise. Valve 190 in generator spoke 186*a* found in sectors J, K, and L are closed to retain the water in its respective generator spoke 186*a*. Valve 190 in generator spoke 186*a* found in sectors F, G, and H are open to receive the water found in generator spoke 186*a* of sectors J, K, and L. The clockwise cycle starts with seventh embodiment 180 being motionless. Valve 190 in sectors J, K, and L are opened and water retained in their respective generator spoke 186*a* pass through turbine 188, thereby generating electricity. The water continues through inner conduit 182 and into generator spoke 186*a* found in sectors F, G, and H. As the water enters generator spoke 186*a* of sectors F, G, and H, it will pass through each respective turbine 188, thereby generating electricity. Once the movement of water from generator spoke 186*a* in sectors J, K, and L has fully moved into generator spoke 186*a* in sectors F, G, and H, valve 190 in generator spoke 186*a* of sectors F, G, and H will close and seventh embodiment 180 will begin to rotate clockwise with the assistance of counterweight spoke 186*c* until it reaches the position shown in FIG. 20B, where it will stop. Here, seventh embodiment 180 is at its leftmost angular position, and counterweight spoke 186*c* are in a position to assist in rotating seventh embodiment 180 counterclockwise. Valve 190 in generator spoke 186*a* found in sectors F, G, and H are closed to retain the water in their respective generator spoke 186*a*. Valve 190 in generator spoke 186*a* found in sectors J, K, and L are open to receive the water found in generator spoke 186*a* of sectors F, G, and H. The counterclockwise cycle starts with seventh embodiment 180 being motionless. Valve 190 in sectors F, G, and H are opened and water retained in their respective generator spoke 186*a* pass through turbine 188, thereby generating electricity. The water continues through inner conduit 182 and into generator spoke 186*a* found in sectors J, K, and L. As the water enters generator spoke 186*a* of sectors J, K, and L, it will pass through each respective turbine 188, thereby generating electricity. Once the movement of water from generator spoke 186*a* in sectors F, G, and H has fully moved into generator spoke 186*a* in sectors J, K, and L, valve 190 in generator spoke 186*a* of sectors J, K, and L will close and seventh embodiment 180 will begin to rotate counterclockwise with the assistance of counter-weight spoke 186*c* until it reaches the position shown in FIG. 20A, where it will stop.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed and that that scope shall not be restricted, except in the light of the appended claims and their equivalents.

What is claimed is:

1. An apparatus suitable for converting hydrokinetic energy into electrical energy, the apparatus being in the form of a wheel and comprising:
- a central axis;
- one or more support rings concentric to the central axis;
- an inner conduit encompassing the central axis being hollow;
- a plurality of hollow cylindrical generating spokes angularly spaced about the wheel, having a proximal end in fluid communications with the inner conduit, a bidirectional inner valve, and a turbine at its proximal end;
- a drive wheel that engages a support ring such that the drive wheel may rotate the wheel; and
- a motor that rotates the drive wheel.

2. The apparatus of claim 1, further comprising one or more support spokes angularly spaced about the wheel, having a proximal end connected to the inner conduit, the support spokes configured to provide the apparatus with structural support.

3. The apparatus of claim 1, further comprising one or more weighted counterweight spokes having a proximal end connected to the inner conduit.

4. The apparatus of claim 3, whereby the counterweight spokes have a center of gravity outside of the outermost support ring.

5. The apparatus of claim 3, further comprising a generator attached to the drive wheel such that when the drive wheel is rotating freely under the assistance of the counter-weight spokes, electricity is generated.

6. The apparatus of claim 1, whereby the drive wheel is frictionally engaged with the outermost support ring.

7. The apparatus of claim 1, whereby the drive wheel is a gear, the outermost support ring comprises a matching set of gear teeth that engage the gear teeth on the drive wheel.

8. The apparatus of claim 1, further comprising a counterweight, the counterweight exists beyond the outermost support ring, is generally elongated, has a longitudinal axis and a lateral axis.

9. The counterweight of claim 8, whereby one half of the counterweight is heavier than the opposite half, and the counterweight rotates about its lateral axis.

10. The apparatus of claim 1, whereby the wheel is partially submerged into a body of water, the inner conduit is solid, and the inner valve is located proximate to the inner conduit and controls the flow of water into and out of the generating spoke.

11. A method for creating electricity using the apparatus of claim 10 comprising the steps:
- turning on the motor;
- rotating the wheel so that one or more generating spokes containing water are rotated into the upper half of the wheel and one or more empty generating spokes are rotated into the lower half of the wheel;
- opening the inner valve of the generating spokes in the lower half of the wheel to allow water to ingress and generating electricity from water passing through the generating spoke's turbine;
- opening the inner valve of the generating spokes in the upper half of the wheel to allow water to egress and generating electricity from water passing through the generating spoke's turbine;
- closing the inner valve of the generating spokes in the lower half of the wheel; and repeating the steps above, following the turning on of the motor, but now rotating the wheel in the opposite direction.

12. A method for creating electricity using the apparatus of claim 1 comprising the steps:
- turning on the motor;
- rotating the wheel so that one or more generating spokes containing water are rotated into the upper half of the wheel and one or more empty generating spokes are rotated into the lower half of the wheel;
- opening the inner valve of the generating spokes in the lower half of the wheel;
- opening the inner valve of the generating spokes in the upper half of the wheel, releasing water that passes through the inner conduit and into the generating spokes in the lower half of the wheel;
- generating electricity from water passing through the turbines found in the generating spokes;
- closing the inner valve of the generating spokes in the lower half of the wheel, thereby retaining the water; and
- repeating the steps above, following the turning on of the motor, but now rotating the wheel in the opposite direction.

13. An apparatus suitable for converting hydrokinetic energy into electrical energy, the apparatus being in the form of a wheel that is partially submerged in a body of water, and comprising:
- a central axis;
- a hollow circular conduit concentric with the central axis;
- a plurality of spokes for structural support, angularly spaced about the wheel, having a proximal end connected to the central axis and a distal end connected to the circular conduit;
- one or more turbines spaced within the circular conduit, each turbine associated with a bidirectional valve;
- a drive wheel that engages the circular conduit such that the drive wheel may rotate the wheel; and
- a motor that rotates the drive wheel.

* * * * *